United States Patent
Gielow

Patent Number: 6,028,969
Date of Patent: Feb. 22, 2000

[54] SYSTEM AND METHOD OF ADDITIVE INTERPOLATION FOR AFFINE TRANSFORMATIONS

[75] Inventor: Thomas Arthur Gielow, Costa Mesa, Calif.

[73] Assignees: Sharp Laboratories of America, Inc., Camas, Wash.; Sharp Kabushiki Kaisha, Osaka, Japan

[21] Appl. No.: 08/958,137

[22] Filed: Oct. 28, 1997

[51] Int. Cl.[7] .................................................. G06K 9/32
[52] U.S. Cl. ........................ 382/300; 382/293; 358/428; 358/525
[58] Field of Search .................................. 382/254–256, 382/293–301, 276–278; 345/515–516, 501, 427, 419, 508–509, 139; 358/428, 525, 447, 448; 364/723; 348/207, 147; 708/313, 290

[56] References Cited

U.S. PATENT DOCUMENTS

| | | | |
|---|---|---|---|
| 5,204,944 | 4/1993 | Wolberg et al. | 345/427 |
| 5,327,257 | 7/1994 | Hrytzak et al. | 358/447 |
| 5,396,592 | 3/1995 | Fujimoto | 345/501 |
| 5,513,120 | 4/1996 | Berlad | 708/290 |
| 5,796,426 | 8/1998 | Gullichsen et al. | 348/207 |
| 5,799,113 | 8/1998 | Lee | 382/256 |

OTHER PUBLICATIONS

Technical Manual Ver. E1.2, Sumitomo Metal Industries, Ltd, entitled, SMI ASSP Image–Processing LSI Series, IP90C16, Affine Transformation Accelerator (Affine).

*Primary Examiner*—Leo H. Boudreau
*Assistant Examiner*—Ishrat Sherali
*Attorney, Agent, or Firm*—David C. Ripma

[57] ABSTRACT

A summing interpolation method is provided for transferring images between coordinate systems in an affine transformation, using a simplified series of interpolation formulas. The small number of interpolation formulas required by the present invention permits the calculation of an interpolated pixel value through the addition of pixels with discrete locations bordering a calculated, non-discrete, pixel location. The data of discrete pixel locations closer to the calculated location are added more often in the interpolation than those further away. Specifically, the non-integer remainder of the calculated location is rounded off to one-quarter increments in the X and Y axis, and an interpolation formula is chosen in response to the rounded increment location values. In this manner, all possible calculated locations are interpolated with a small number of fixed interpolation formulas. A interpolation summing system, for use in an affine transformation, is also provided.

14 Claims, 10 Drawing Sheets

INPUT IMAGE

OUTPUT IMAGE

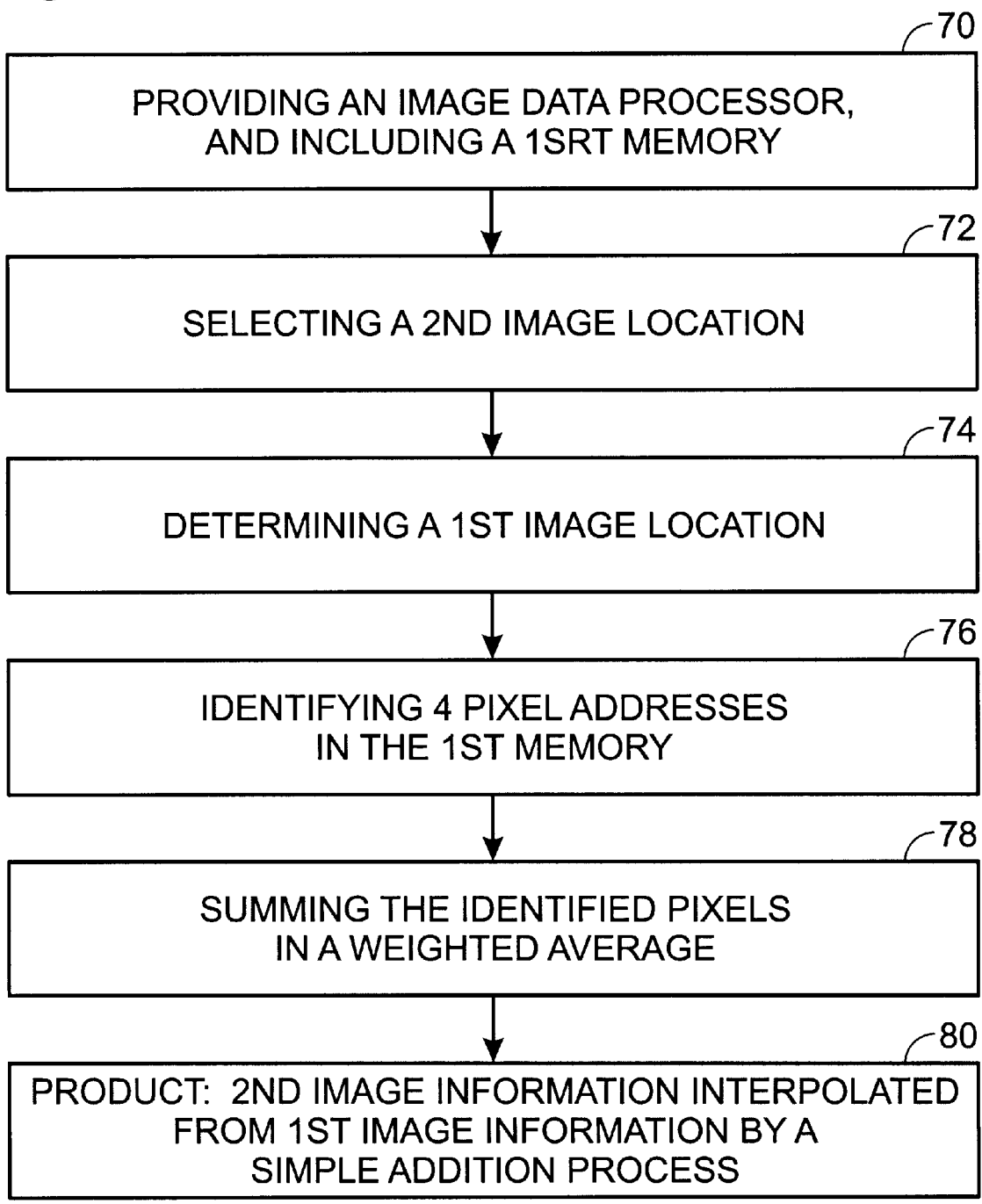

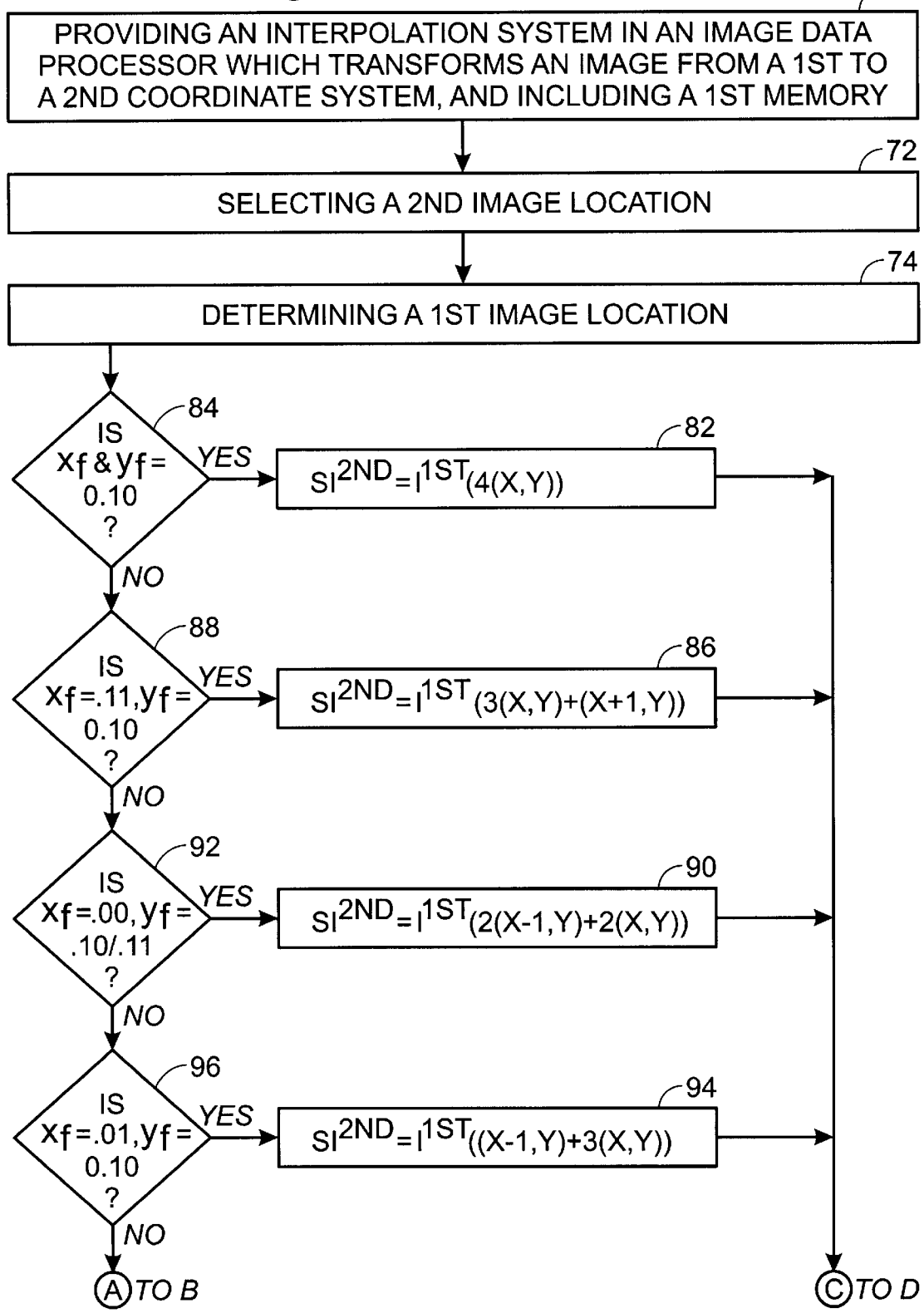
Fig. 5 (SHEET 1 OF 3)

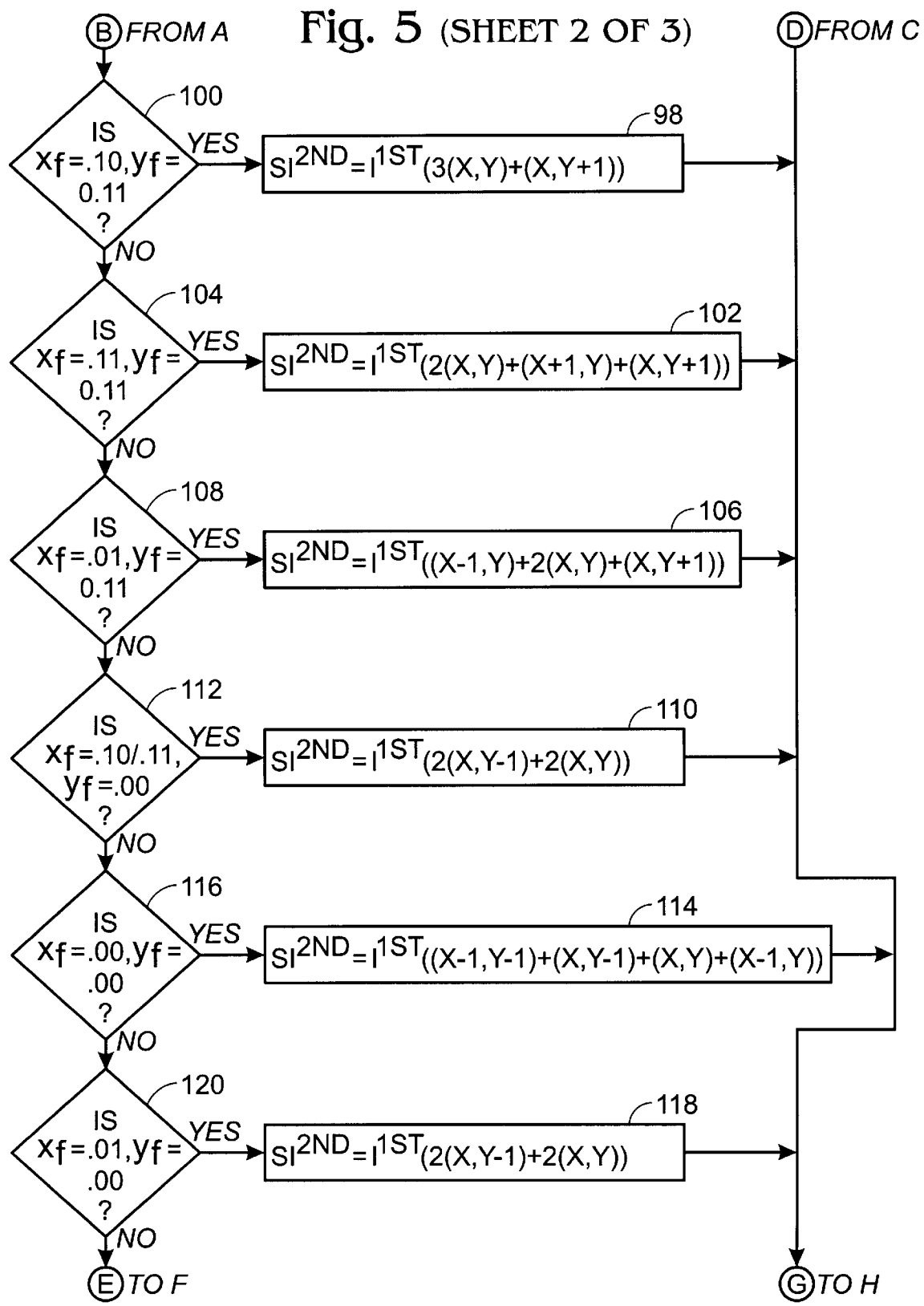
Fig. 5 (SHEET 2 OF 3)

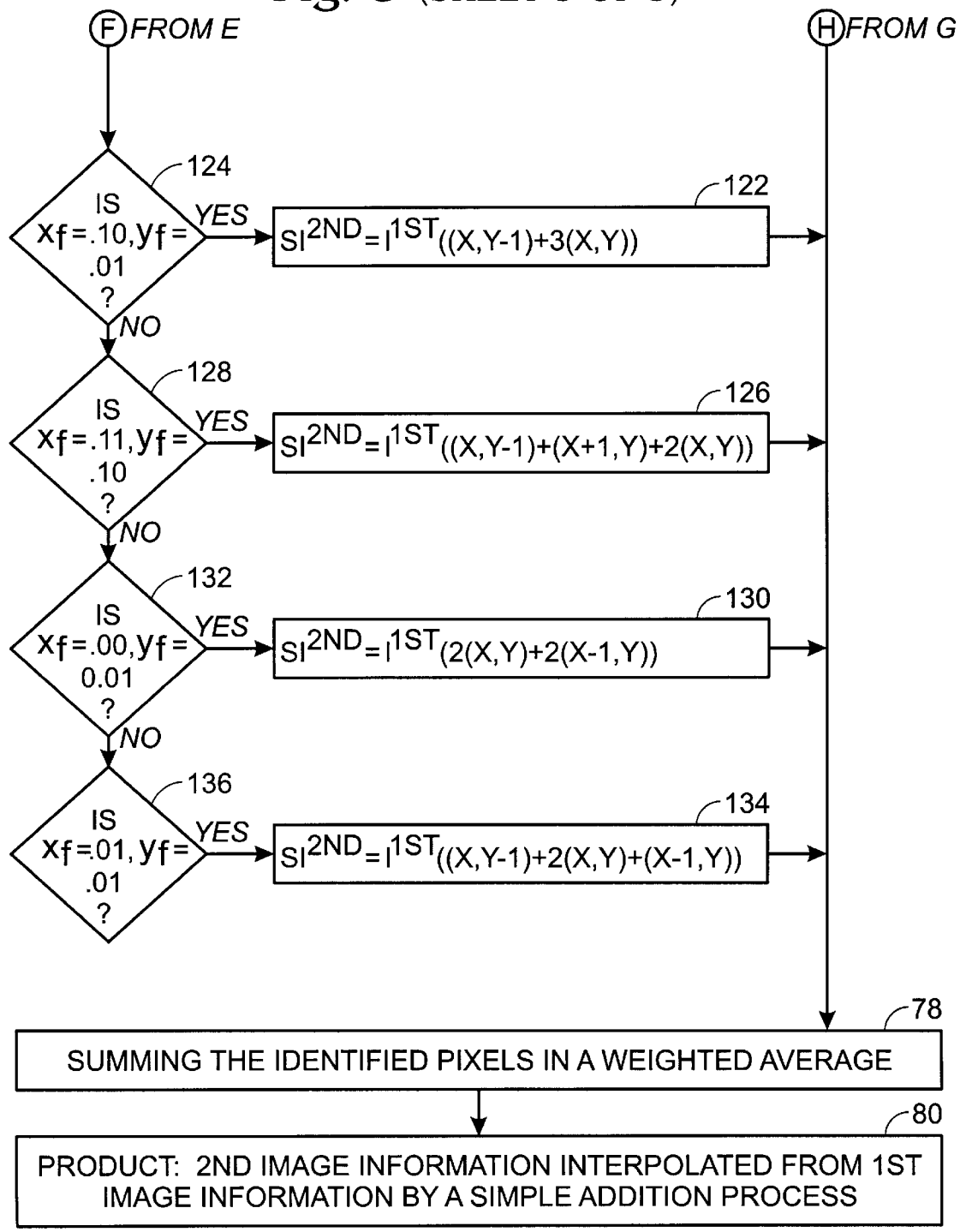
Fig. 5 (SHEET 3 OF 3)

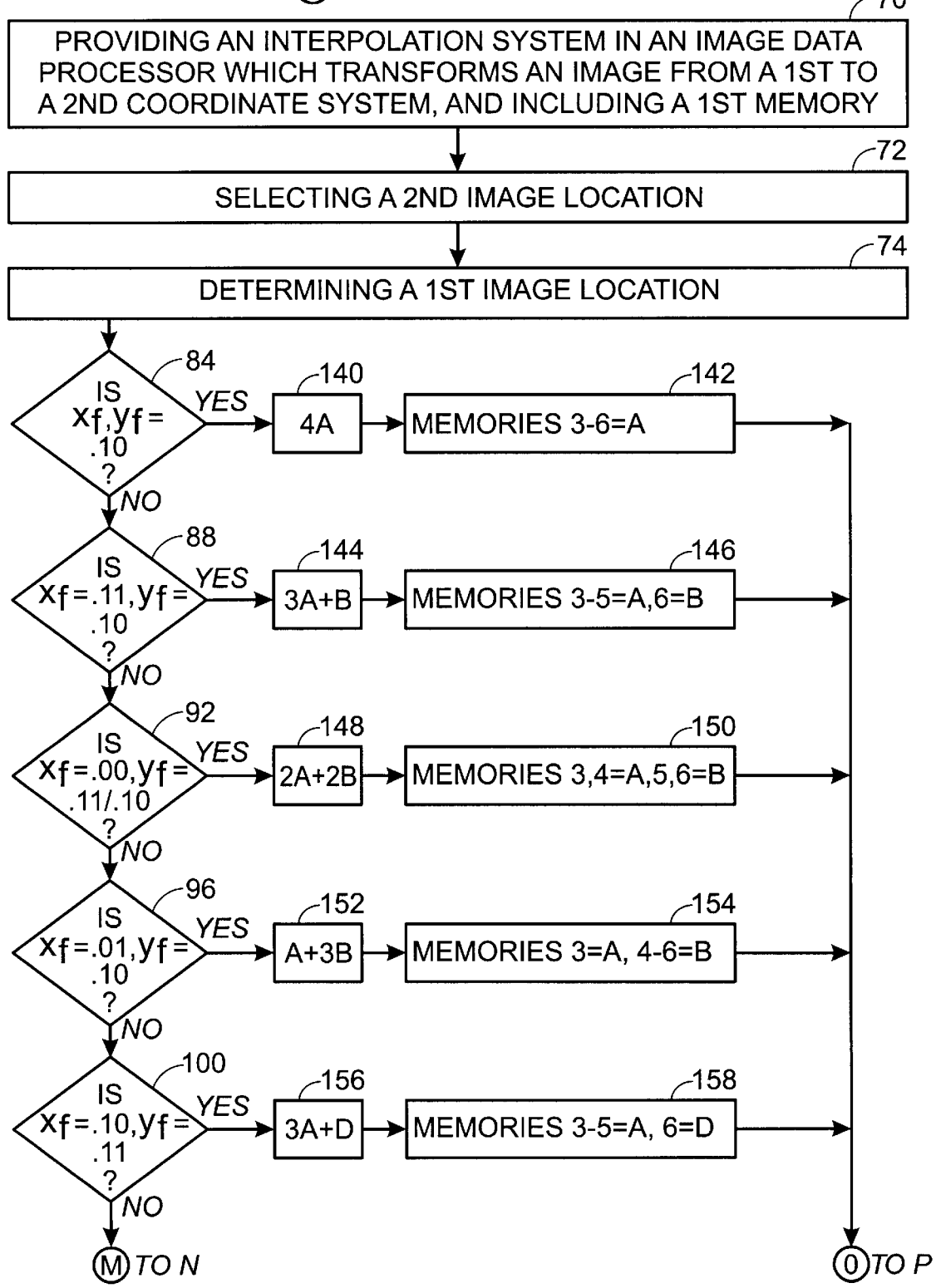
Fig. 6 (SHEET 1 OF 3)

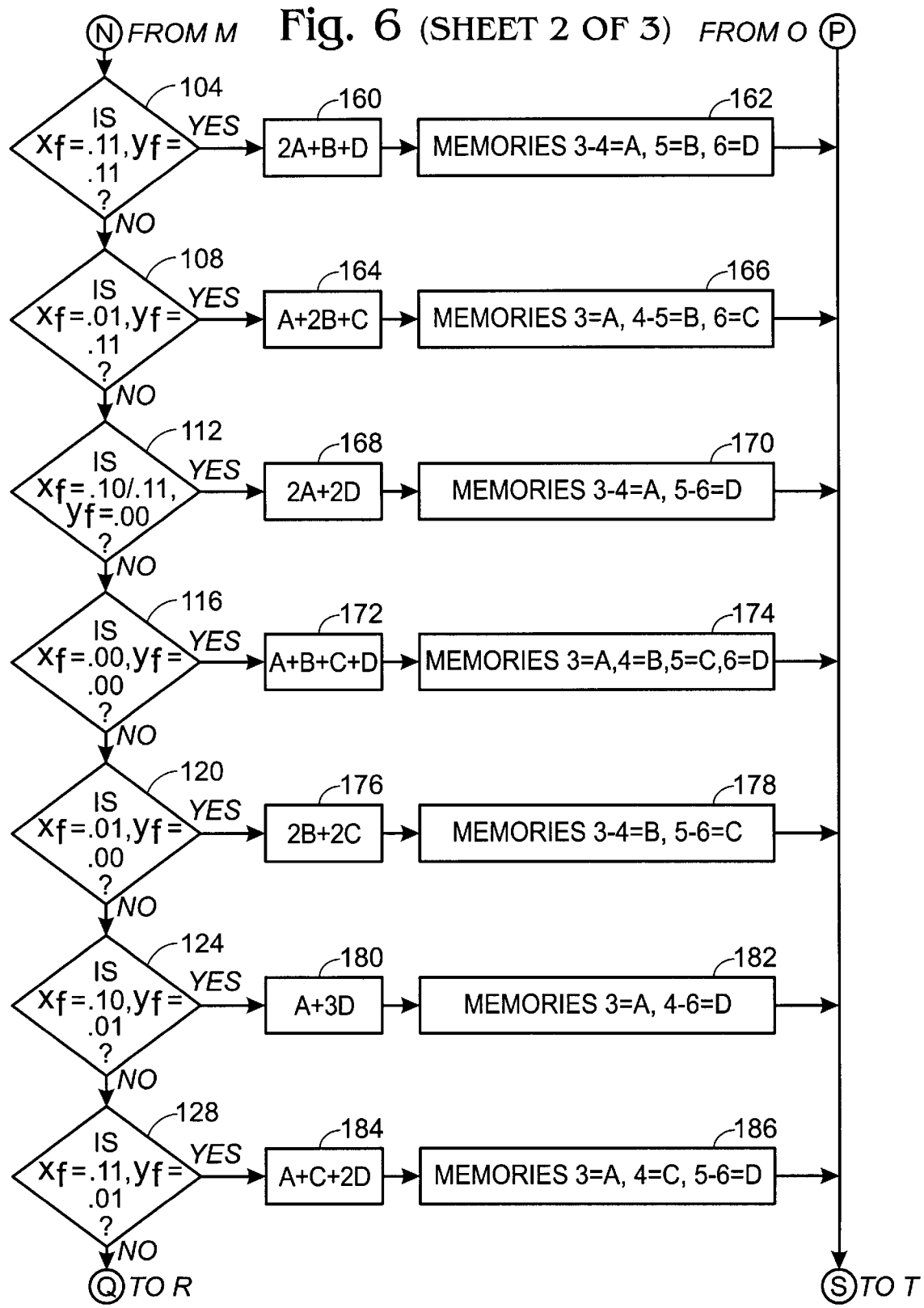

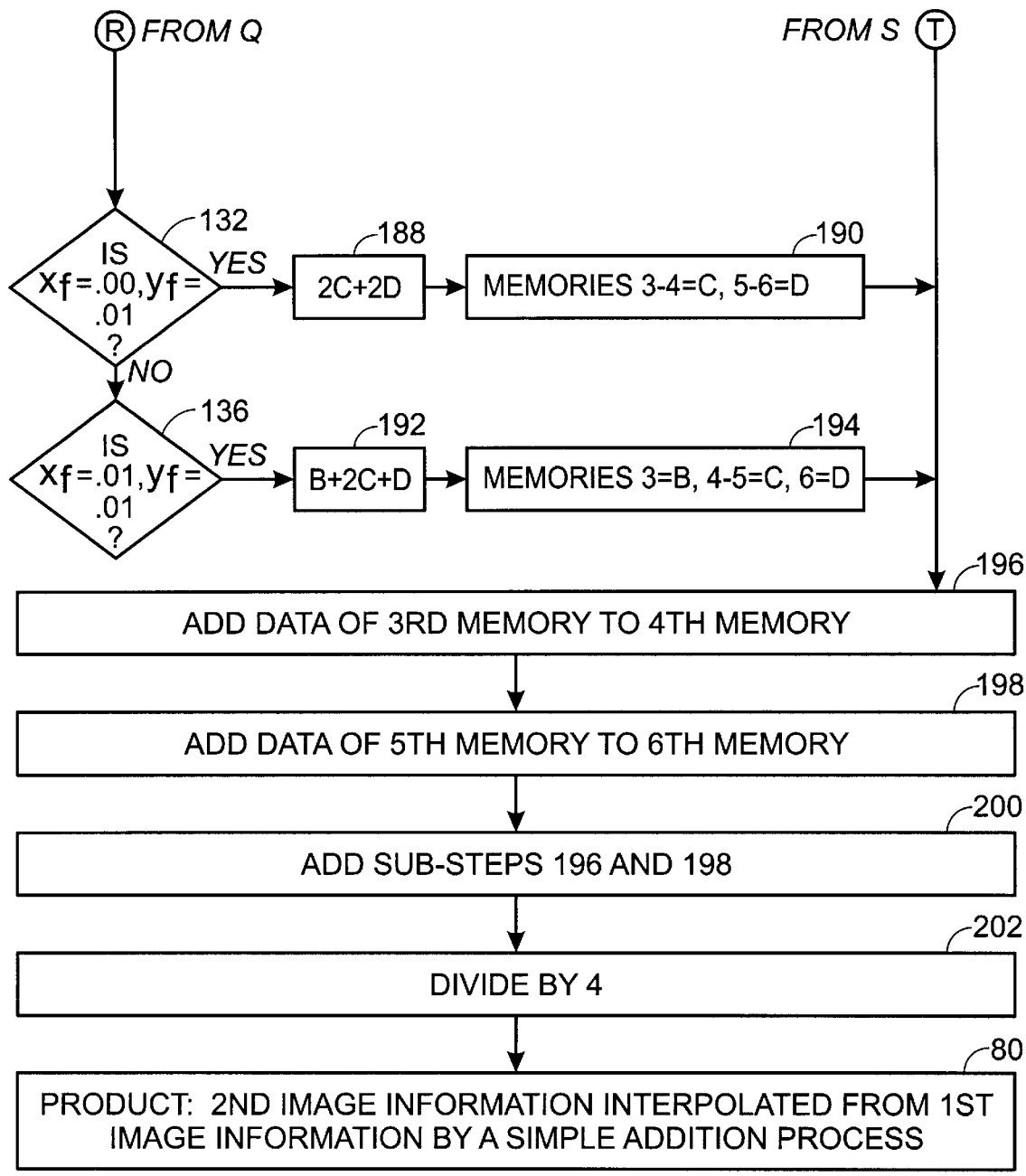
Fig. 6 (SHEET 3 OF 3)

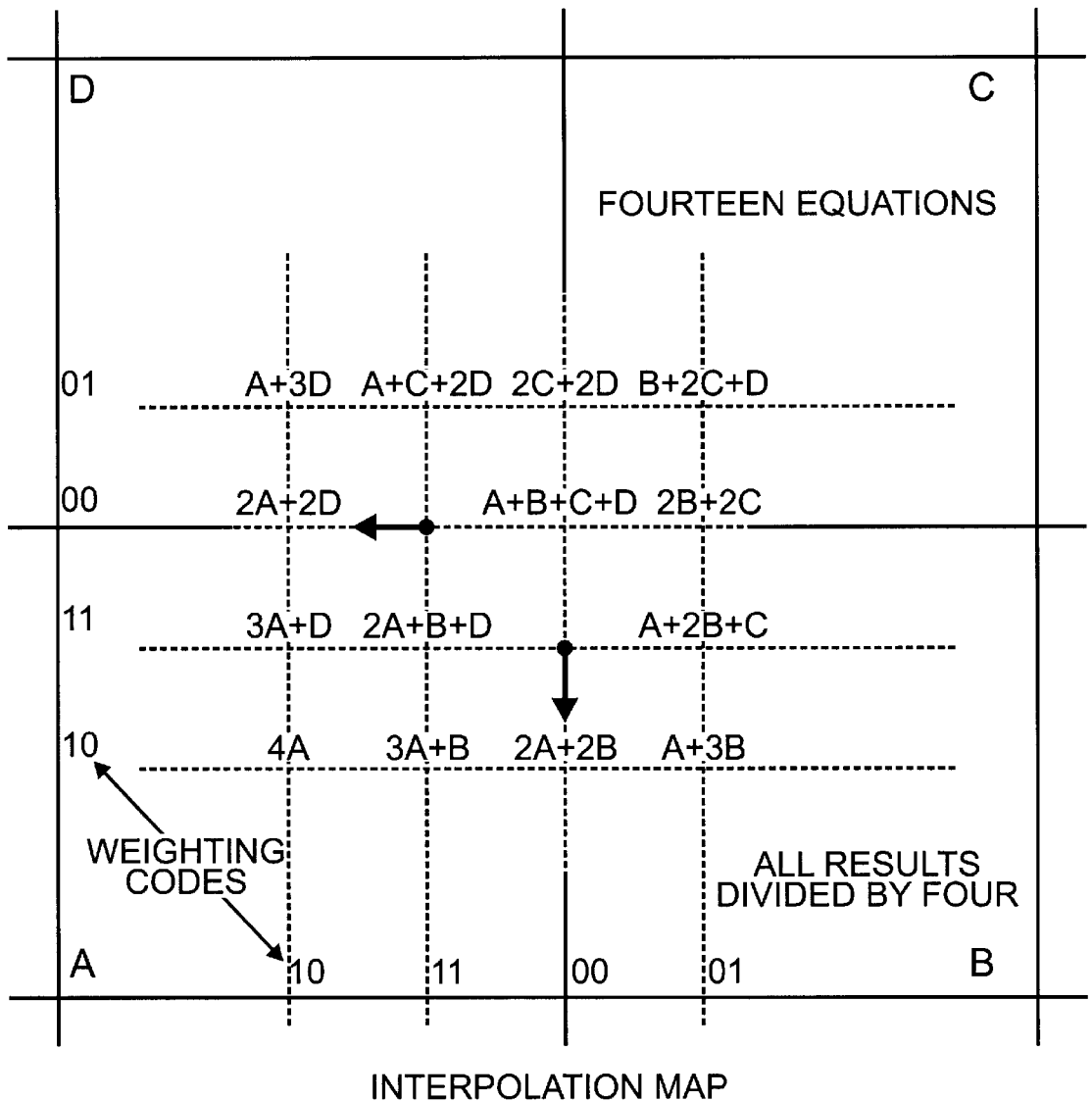

SYSTEM AND METHOD OF ADDITIVE INTERPOLATION FOR AFFINE TRANSFORMATIONS

BACKGROUND AND SUMMARY OF THE INVENTION

This invention relates generally to an affine transformation of digital imaging information and, more particularly, to a system and method of mapping an image so that data is interpolated using a simple summing procedure.

Affine transformations are used in the processing of digital images, and are performed when the user finds it necessary to manipulate a graphic image stored in memory. Transformations are performed to rotate, enlarge, or zoom in on a particular feature in the stored memory. An affine transformation rotates or translates an image by keeping straight lines straight and parallel lines parallel, but by altering the distance between points.

One popular industrial application of the affine transformation process is in the checking of product labels. Product labels are checked by computer for accuracy by comparing an image of the label taken by video camera to a template, or golden label image in computer memory. If the image sensed by the camera matches the template, the label is found acceptable by the computer and passed to the next step in the process. A problem exists, however, when the label is slightly askew. Then a number of otherwise acceptable labels will not match the template. That is, the label image on camera will appear slightly crooked in comparison to the template label in memory. Because the labels are not an exact match, the product is needlessly rejected. One method of solving this problem is to provide a large number of templates, including slightly misaligned images in memory. In this manner, a product label on camera is compared to a variety of templates until a match is found. However, this method takes a great deal of memory and slows the identification process considerably.

Another, more effective method of comparing a video image of a product label to a template is to use an affine transformation process. The video image of the crooked label is transformed until the image is made to appear "straight" with regard to the template. The transformed image is then compared to the template and, when a match occurs, the product is passed on to the next step in the process. In this manner, a wide variety of differing, but acceptable, product labels can be tested quickly against the template.

As is well known in the art, a video camera captures an image by breaking the image into a series of sequential rows starting from the top of the screen and continuing to the bottom. Brightness information is recorded in sequential and periodic locations along each row. Each location of image information is called a pixel. When a color video camera is used, many systems devote an equal number of pixels to each of the three primary colors. Typically, 256 values (8 bits) are devoted to the resolution of each pixel color. The image information is located in discrete pixel addresses which are organized to represent the image in a two dimensional (X,Y) matrix. Each pixel in this matrix can be represented by a unique X and Y coordinate, with each location separated by integer X and Y values. Each pixel address in the matrix can then be stored in digital memory. When the image is to be viewed, the memory can be accessed and the pixel information transferred to a cathode ray tube (CRT). The pixel information scanned across the CRT is organized in a manner similar to way in which it was recorded.

When the video image in memory is simply transferred from memory to the CRT, or another memory, no affine transformation process is required. That is, there is a one-for-one relationship between each pixel stored in memory and each pixel displayed on the CRT. As each sequential pixel in a row of a CRT is scanned, corresponding pixels in sequential memory addresses are accessed to transfer the pixel data.

When the image in memory is to be translated, rotated, or changed in scale, an affine transformation process is required. There is no longer a one-for-one relationship between pixel addresses in memory and the order in which the CRT is scanned. Even if the image in memory is just to be rotated, it is no longer possible to sequentially access addresses in memory. FIG. 1 depicts an image in a first memory to be transformed (prior art). FIG. 2 depicts the image of FIG. 1 after a rotation of 120 degrees clockwise, and expansion by a factor of 1.7 (prior art). To accomplish the transformation, the order in which addresses in the first memory are accessed must be changed to suit the organization of pixel information supplied to the CRT, or second memory of FIG. 2. The problem becomes further complicated when discrete pixel locations on the CRT no longer correspond to discrete locations in memory. That is, the discrete point in the transformed image, for which image information is required, falls in-between discrete pixel locations in the untransformed image. This situation requires that information from surrounding discreet locations be used in an estimation, or interpolation to supply the pixel information.

In a forward mapping transformation process, the pixel information in a discrete memory location is selected and translated to an address in a second memory system, or CRT. The address in the second system is calculated to perform the required scaling or rotation transformation. When the calculated address from the second system does not match an actual discreet address then an interpolation function must be performed. The information for the calculated address is a weighted average of pixel information associated with the surrounding discrete addresses. With inverse mapping a discrete address is selected in the second memory, or CRT, and the location of the required pixel information in the first memory system is calculated. When the calculated address in the first memory system is not a discrete address, then information from surrounding discrete addresses is supplied.

Once information is required for a particular address in the memory of the transformed image, it is well known in the art to use matrix multiplication techniques to calculate a location in the untransformed image from which information is to be obtained, for transfer to the second memory address. As mentioned above, the calculated location is usually between discrete addresses in the untransformed memory. There are also a number of well known techniques to interpolate the information from surrounding pixel addresses. Typically, these interpolation techniques require calculations of the proximity between the calculated location and surrounding pixel addresses, and numerous steps of multiplication to weight the contribution of each pixel to the average. This proportional averaging technique requires many clock cycles of processor time to complete because of the relatively complication steps of multiplication.

In the prior art multiplication process, the calculated brightness, or image information for a source location can be represented as $C[X+x_f, Y+y_f]$, calculated from discrete addresses, coordinates $[X, Y]$, $[X+1, Y]$, $[X, Y+1]$, and $[X+1, Y+1]$. The calculated brightness is found from the sum of four products, of four weighting factors, times four brightness values. The sum of the products must always add to unity; W[X, Y]+W[X+1, Y]+W[X, Y+1]+W[X+1, Y+1]= 1.

$$W[X, Y] = (1-x_f)(1-y_f) = 1 - y_f - x_f + (x_f * y_f)$$
$$W[X+1, Y] = x_f * (1-y_f) = x_f - (x_f * y_f)$$
$$W[X, Y+1] = (1-x_f) * y_f = y_f \quad (x_f * y_f)$$
$$W[X+1, Y+1] = x_f * y_f = (x_f * y_f)$$

For example, let $x_f$=0.3 and $y_f$=0.6, then $$W[X, Y] = .7 * .4 = .28$$
$$W[X+1, Y] = .3 * .4 = .12$$
$$W[X, Y+1] = .7 * .6 = .42$$
$$W[X+1, Y+1] = .3 * .6 = \underline{.18}$$
$$1.00$$

As can be seen above, the multiplication process not only involves a step of summation, but also several steps of multiplication, which is very costly in processor time.

Typically, affine transformation interpolation processes are carried out through the use of software routines. Even using high speed microprocessors, or parallel processing systems, an affine transformation requires a relatively substantial amount of computer processing time. Long processing times translate to slow and clumsy applications and poor productivity. The process speed is increased by combining the software with hardware devices which quickly perform mathematical functions. However, the use of specialized hardware increases both the size and cost of the end unit.

It would be advantageous if the number of steps in the mathematical calculation of an affine transformation interpolation could be reduced to minimize the time required to perform the transformation.

It would be advantageous if an improved interpolation process required fewer, and simpler hardware devices to support mathematical calculations.

It would be advantageous if a simplified weighting procedure, eliminating multiplication steps, could be developed for use in an affine transformation.

It would be advantageous if the type of calculations performed in an interpolation process could be simplified to speed process time. Specifically, it would be advantageous if a simplified method of assigning weight to surrounding pixels could be developed, and the averaging of the weighted pixel data could be performed without multiplication.

Accordingly, a multiplication-free image data interpolation system for use in an image data processor, which transforms a first image formed in a first coordinate system into a transformed image in a second coordinate system, has been provided. The interpolation system comprises a first memory for storing first image information ($I_{1st}$) as pixel data. The first memory also has an output to supply the pixel data. The system further comprises a source location calculator having an input to accept locations in the second coordinate system, from which source locations of image information ($I^{1st}$) in the first coordinate system are determined and made available on a source location calculator output.

The system includes a source pixel selector having an input operatively connected to the source location calculator output, for identifying up to four pixels in the first memory from which image information ($I^{2nd}$) is derived for each second image location. The source pixel selector also has an output to provide pixel identification. Further, a summing circuit having inputs operatively connected to the first memory output is included. The summing circuit sums the data ($I^{1st}$) of the pixels identified by the source pixel selector, in the calculation of a weighted average for transfer to each second image location as second image information ($I^{2nd}$). In this manner, image information is interpolated by a simple addition process.

In some aspects of the invention, the first memory stores first image information as pixel data ($I^{1st}$) with discrete pixel addresses corresponding to locations in the first coordinate system. Then, the source locations of image information ($I^{1st}$) in the first coordinate system, determined by said source location calculator, include source locations intermediately located between discrete addresses in the first memory. The source pixel selector identifies up to four pixel addresses in the first memory proximate each source location from which image information ($I^{2nd}$) is derived for each second image location, and the summing circuit sums the weighted pixel data ($I^{1st}$) from each selected pixel address to determine second image information ($I^{2nd}$). Each weighted summation is based on the proximity of selected first memory pixel addresses and the corresponding source location within one-quarter of a discrete pixel address. The first memory pixel data ($I^{1st}$) from selected proximate pixel addresses is summed in increments of one-quarter of its pixel data value. In this manner, an interpolated value is calculated for $I^{2nd}$ based on summing one or more values of $I^{1st}$.

Specifically, the first memory stores pixel data ($I^{1st}$) in discrete addresses corresponding to locations (X, Y) in the first coordinate system separated by integer X and Y increment values. The source location in the first coordinate system calculated by the source location calculator for each second image pixel address includes X and Y increment values and a predetermined number of fractional bits of partial X and Y increment values $x_f$ and $y_f$, respectively. The source location for each second image pixel location is ($X+x_f$, $Y+y_f$) in the first coordinate system.

In an image data processor including a first memory to store first image information ($I^{1st}$) as discrete pixel data, with each pixel having an address corresponding to a location in a first coordinate system, a multiplication-free interpolation method for transforming an image formed in the first coordinate system into a transformed image in a second coordinate system is also provided. The method comprises the steps of:

a) selecting a second image location in the second coordinate system;

b) determining a first image location in the first coordinate system corresponding to the second location selected in Step a);

c) identifying up to four pixel addresses in the first memory proximately located to the first image location determined in Step b); and d) summing the first image pixel data ($I^{1st}$) of the pixel addresses identified in Step c) in a weighted average for transfer to the second image location as second image information ($I^{2nd}$), whereby first image information ($I^{1st}$) is interpolated by a simple addition process.

BRIEF DESCRIPTIONS OF THE DRAWINGS

FIG. 4 is a flow chart illustrating steps in the multiplication-free interpolation method for transforming an image formed in a first coordinate system into a transformed image in a second coordinate system.

FIG. 5 is a flow chart illustrating in greater detail the pixel identification step of FIG. 4

FIG. 6 is a flow chart illustrating in greater detail the pixel identification and one-quarter pixel weighting steps of FIG. 5.

FIG. 7 is an interpolation map illustrating the relationship between fractional addresses and the pixel interpolation weighting criteria.

DETAILED DESCRIPTION OF THE PREFERRED EMBODIMENT

Figure 1:
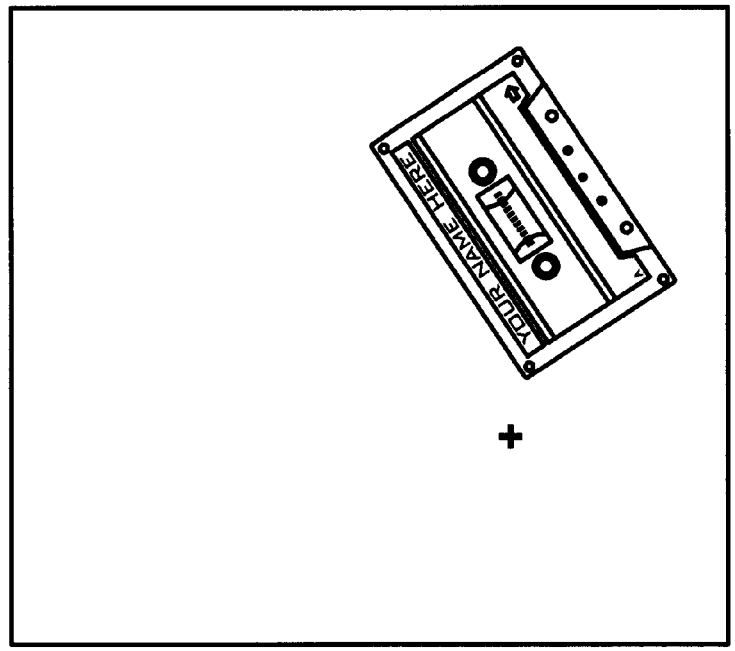
FIG. 1 depicts an image in a first memory to be transformed (prior art).
Figure 2:
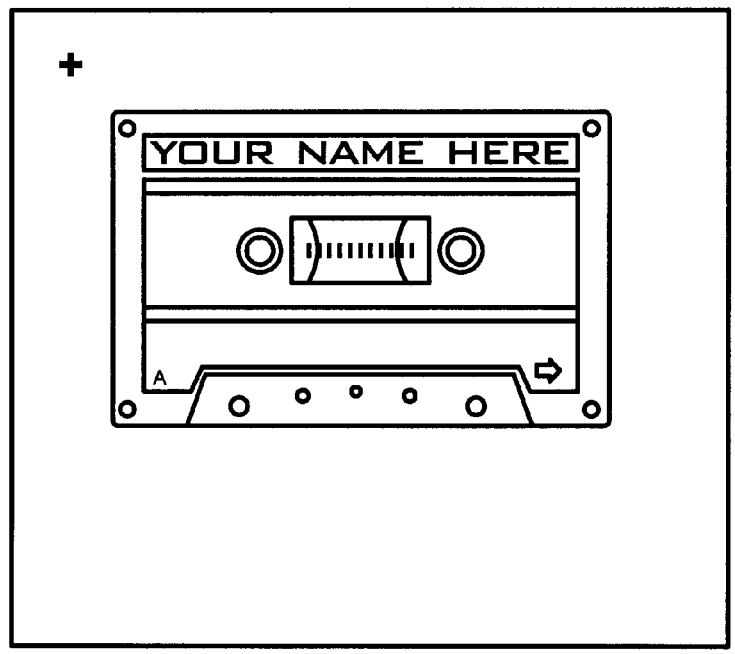
FIG. 2 depicts the image of FIG. 1 after a rotation of 120 degrees clockwise, and expansion by a factor of 1.7 (prior art).
Figure 3:
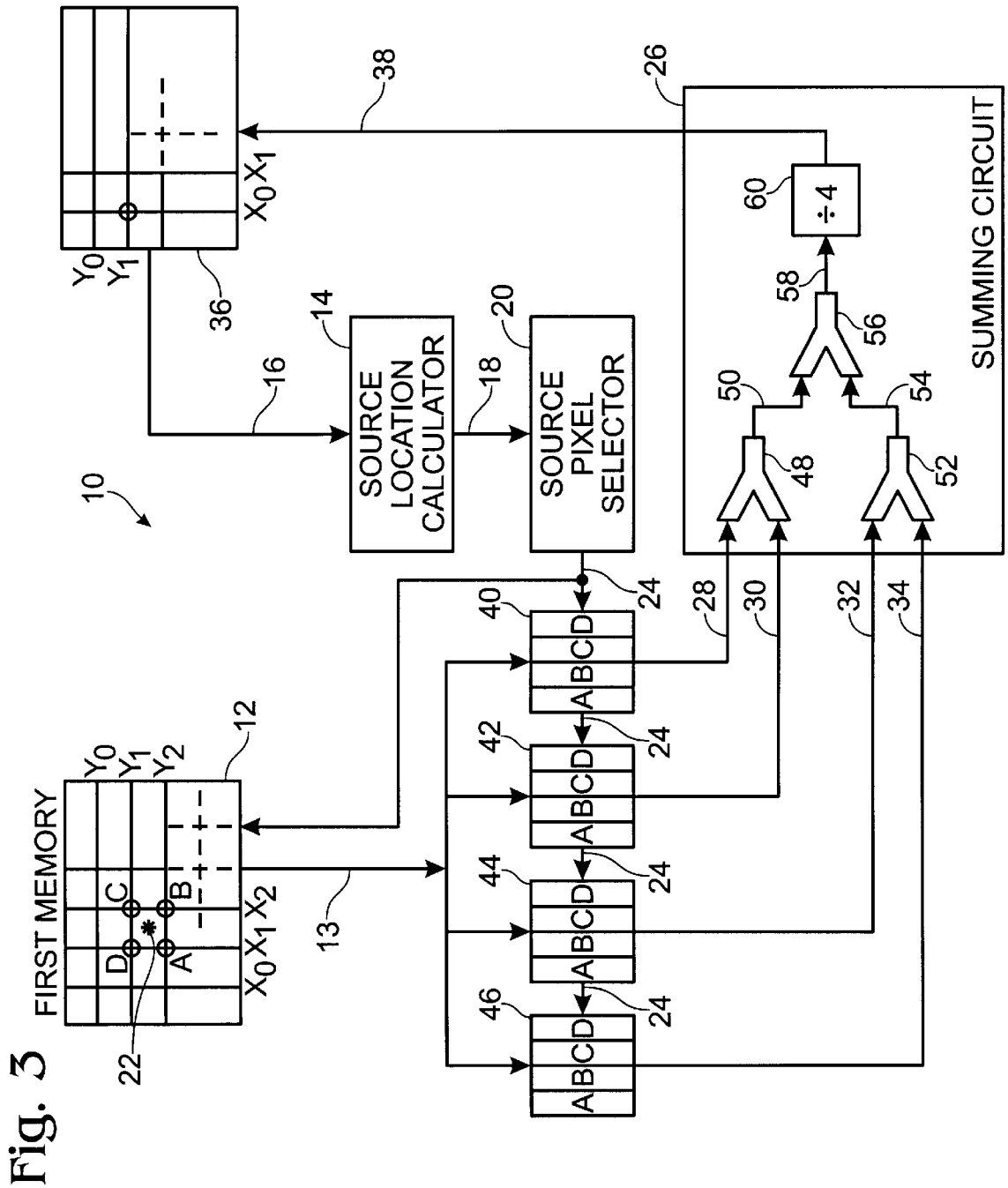
FIG. 3 is a schematic block diagram of the multiplication-free interpolation system of the present invention.

FIG. 3 is a schematic block diagram of the multiplication-free interpolation system 10 of the present invention. Interpolation system 10 is used in an image data processor (not shown) to transform a first image formed in a first coordinate system into a transformed image in a second coordinate system. Interpolation system 10 comprises a first memory 12 for storing image information ($I^{1st}$) as pixel data. The first image is the image to be transformed, as the image in FIG. 1 was transformed into a second image in FIG. 2, above. First memory 12 is any one of a number of digital memory storage devices as are well known in the art. Alternately, the first image is captured in a device, such as a video camera, which represents data in a coordinate system of discrete addresses. First memory 12 stores first image information as pixel data ($I^{1st}$) with discrete pixel addresses corresponding to locations in the first coordinate system.

There are many possibilities for organizing an image in a first coordinate system into pixel data having discrete addresses. One common method, is to represent the first image in an (X, Y) coordinate system. First memory 12 stores pixel data ($I^{1st}$) in discrete addresses corresponding to locations (X, Y) in the first coordinate system separated by integer X and Y increment values. First memory 12 is shown structured with an X and Y axis, with each intersection of integer X and Y values being represented by a unique pixel address. The addresses are stored anywhere in first memory 12, as long as record is kept of the relationship between (X, Y) locations in the first coordinate system and addresses in first memory 12. First memory has an output operatively connected to line 13. Typically, each pixel is represented with 8 bits of information, however, the system of the present invention is not limited to any particular resolution of data.

The interpolation process starts when a request is made for information stored in first memory 12, in configuring a second image in a second coordinate system. Source location calculator 14 has an input, operatively connected to line 16, to accept locations in the second coordinate system from which source locations of image information ($I^{1st}$) in the first coordinate system are determined and made available on a source location calculator output operatively connected to line 18. The source locations of image information ($I^{1st}$) in the first coordinate system, determined by source location calculator 14, include source locations intermediately located between discrete addresses in said first memory. Even though the second coordinate system may be structured identically to first memory 12, with discrete address locations for the storage of image data, due to the rotation and change of scale involved in many transformations, the first image source location is unlikely to coincide with a discrete address in first memory 12.

The source location in the first coordinate system calculated by source location calculator 14 for each second image pixel address includes X and Y increment values and a predetermined number of fractional bits of partial X and Y increment values $x_f$ and $y_f$, respectively. In this manner, the source location for each second image pixel location is $(X+x_f, Y+y_f)$ in the first coordinate system.

Source pixel selector 20 has an input operatively connected with line 18, to the output of source location calculator 16, for identifying up to four pixels in first memory 12 from which image information ($I^{2nd}$) is derived for each second image location. Source pixel selector 20 identifies up to four pixel addresses in first memory 12 proximate each source location from which image information ($I^{2nd}$) is derived for each second image location. As represented in first memory 12, a source location has a position 22 in the (X, Y) first coordinate system. Source pixel selector 20 selects four discrete addresses (A, B, C, and D) in first memory 12 proximate to source location 22. From these four addresses, image information ($I^{1st}$) will be weighted and averaged in an interpolation process to create image information ($I^{2nd}$) for the transformed image in the second coordinate system. In special circumstances, such as when source location 22 is on the edge of the first image, there are less than four pixels used for interpolation. Source pixel selector 20 has an output to provide pixel identification operatively connected to line 24.

A summing circuit 26 has inputs operatively connected through lines 28, 30, 32, and 34 to first memory output 13, to sum the data ($I^{1st}$) of the pixels (A, B, C, and D) identified by source pixel selector 20. Identified pixels A, B, C, and D are summed in the calculation of a weighted average, estimate, or interpolation for transfer to each second image location as second image information ($I^{2nd}$). In this manner, image information is interpolated by a simple addition process.

Summing circuit 26 sums the weighted pixel data ($I^{1st}$) from each selected pixel address to determine second image information ($I^{2nd}$). Each weighted summation is based on the proximity of selected first memory pixel addresses and the corresponding source location within one-quarter of a discrete pixel address. First memory pixel data ($I^{1st}$) from selected proximate pixel addresses is summed in increments of one-quarter of its pixel data value. An interpolated value is calculated for $I^{2nd}$ based on summing one or more values of $I^{1st}$.

The simplified process of the present invention stems from the use of an interpolation map which reduces all the myriad of possible source locations between four pixels into just 14 possibilities. These are the possible combinations of pixels using one-quarter increments of pixel data and pixel addresses. The source locations are rounded-off to a resolution of 0.25 in both the X and Y axis. The 0.25 pixel resolution is, in turn, used to select all the possible combinations of adding together four pixel values, using the data from one to four pixel addresses. Prior art systems use a complicated multi-clock period method to calculate an interpolation formula of a weighted pixel average for every calculated source location, as presented in the Background section, above. Due to the limited number of interpolation formulas in the present invention, the interpolation process is technically not as precise as prior art methods for some source locations. However, the lack of precision is not distinguishable, and the speed of interpolation is dramatically improved.

Typically, interpolation system 10 further comprises a second memory 36, having an output operatively connected with line 16 to the input of source location calculator 14. Second memory 36 provides discrete pixel addresses as second image locations in the second coordinate system. Second memory 36 also has an input operatively connected to line 38 for accepting the second image information ($I^{2nd}$) as pixel data in discrete pixel addresses.

Returning again to summing circuit 26, scaled pixel data ($SI^{2nd}$) for each address in second memory 36 is determined by summing circuit 26, from a source location ($X+x_f$, $Y+y_f$) in the first coordinate system (X, Y), by weighing the pixel data ($I^{1st}$) of addresses identified by source pixel selector 20. Source pixel selector 20 uses a simplified interpolation map to select the pixel addresses to be summed. The pixel data is derived from additive combinations of the proximate pixel addresses as follows:

$SI^{2nd}=I^{1st}(X, Y)+I^{1st}(X, Y)+I^{1st}(X, Y)+I^{1st}(X, Y)$, when the two most significant bits of both $x_f$ and $y_f$, written in binary form, are 0.10;

$SI^{2nd}=I^{1st}(X, Y)+I^{1st}(X,Y)+I^{1st}(X,Y)+I^{1st}(X+1, Y)$, when the two most significant bits of $x_f$ are 0.11, and of $y_f$ are 0.10;

$SI^{2nd}=I^{1st}(X-1, Y)+I^{1st}(X-1, Y)+I^{1st}(X, Y)+I^{1st}(X, Y)$, when the two most significant bits of $x_f$ are 0.00, and of $y_f$ are 0.11 and 0.10;

$SI^{2nd}=I^{1st}(X-1,Y)+I^{1st}(X,Y)+I^{1st}(X,Y)+I^{1st}(X,Y)$, when the two most significant bits of $x_f$ are 0.01, and of $y_f$ are 0.10;

$SI^{2nd}=I^{1st}(X, Y)+I^{1st}(X,Y)+I^{1st}(X,Y)+I^{1st}(X,Y+1)$, when the two most significant bits of $x_f$ are 0.10, and of $y_f$ are 0.11;

$SI^{2nd}=I^{1st}(X, Y)+I^{1st}(X, Y)+I^{1st}(X+1, Y)+I^{1st}(X, Y+1)$, when the two most significant bits of both $x_f$ and $y_f$ are 0.11;

$SI^{2nd}=I^{1st}(X-1, Y)+I^{1st}(X, Y)+I^{1st}(X, Y)+I^{1st}(X, Y+1)$, when the two most significant bits of $x_f$ are 0.01, and of $y_f$ are 0.11;

$SI^{2nd}=I^{1st}(X, Y-1)+I^{1st}(X, Y-1)+I^{1st}(X, Y)+I^{1st}(X, Y)$, when the two most significant bits of $x_f$ are 0.10 and 0.11, and of $y_f$ are 0.00;

$SI^{2nd}=I^{1st}(X-1, Y-1)+I^{1st}(X, Y-1)+I^{1st}(X, Y)+I^{1st}(X-1, Y)$, when the two most significant bits of both $x_f$ and $y_f$ are 0.00;

$SI^{2nd}=I^{1st}(X, Y-1)+I^{1st}(X, Y-1)+I^{1st}(X, Y)+I^{1st}(X, Y)$, when the two most significant bits of $x_f$ are 0.01, and of $y_f$ are 0.00;

$SI^{2nd}=I^{1st}(X, Y-1)+I^{1st}(X,Y)+I^{1st}(X,Y)+I^{1st}(X, Y)$, when the two most significant bits of $x_f$ are 0.10, and of $y_f$ are 0.01;

$SI^{2nd}=I^{1st}(X, Y-1)+I^{1st}(X+1, Y)+I^{1st}(X, Y)+I^{1st}(X, Y)$, when the two most significant bits of $x_f$ are 0.11, and of $y_f$ are 0.01;

$SI^{2nd}=I^{1st}(X, Y)+I^{1st}(X, Y)+I^{1st}(X-1, Y)+I^{1st}(X-1, Y)$, when the two most significant bits of $x_f$ are 0.00, and of $y_f$ are 0.01; and $SI^{2nd}=I^{1st}(X, Y-1)+I^{1st}(X, Y)+I^{1st}(X, Y)+I^{1st}(X-1, Y)$, when the two most significant bits of both $x_f$ and $y_f$ are 0.01.

Once scaled pixel data $SI^{2nd}$ has been summed as above, summing circuit 26 divides each scaled pixel data ($SI^{2nd}$) by 4 to complete the interpolation process, before transferring second image pixel data ($I^{2nd}$) to pixel addresses in second memory 36. In this manner, the summed first image information ($I^{1st}$) is interpolated. As is well known, the division of a binary number by 4 is a simple process, similar to division by 10 with a decimal number. The last two digits of the binary number are either discarded, or the number is shifted 2 places to the right.

Interpolation system 10 further comprises a third memory 40 having inputs operatively connected with line 13 to the output of first memory 12 and said source pixel selector output 24, for storing the pixel data ($I^{1st}$) of four pixel addresses A, B, C, and D in first memory 12 that have been identified by source pixel selector 20. Third memory 40 has an output operatively connected with line 28 to supply summing circuit 26 with the pixel data ($I^{1st}$) of one pixel address in response to commands from source pixel selector 20.

A fourth memory 42 has inputs operatively connected to first memory output 13 and source pixel selector output 24 for storing the pixel data ($I^{1st}$) of four pixel addresses A, B, C, D in first memory 12, identified by source pixel selector 20. Fourth memory 42 has an output operatively connected with line 30 to supply summing circuit 26 with the pixel data ($I^{1st}$) of one pixel address in response to commands from source pixel selector 20.

A fifth memory 44 has inputs operatively connected to first memory output 13 and source pixel selector output 24 for storing the pixel data ($I^{1st}$) of four pixel addresses A, B, C, and D in first memory 12, identified by source pixel selector 20. Fifth memory 44 has an output operatively connected with line 32 to supply summing circuit 26 with the pixel data ($I^{1st}$) of one pixel address in response to commands from source pixel selector 20.

A sixth memory 46 has inputs operatively connected to first memory output 13 and source pixel selector output 24 for storing the pixel data ($I^{1st}$) of four pixel addresses A, B, C, and D in first memory 12, identified by source pixel selector 20. Sixth memory 46 has an output operatively connected with line 34 to supply summing circuit 26 with the pixel data ($I^{1st}$) of one pixel address in response to commands from source pixel selector 20.

Memories 40, 42, 44, and 46 are essentially identical, and are all loaded with the same four words of pixel information corresponding to the four addresses proximate source location 22. Once the four addresses are loaded in memories 40, 42, 44, and 46, a single address from each in the memories is, in turn, shifted to summing circuit 26 in another single clock period. The choice of which address to select in each memory 40, 42, 44, and 46 is made by source pixel selector 20 after an analysis of the incremental portion of the source location, the two most significant bits to the right of the decimal place. The weighting process used to interpolate the four pixel addresses is accomplished in only 2 pipeline clocks, which have a latency of only a few nanoseconds and contribute no delay to the interpolation process.

Summing circuit 26 includes a first adder circuit 48 having a first input operatively connected with line 28 to the output of third memory 40, and a second input operatively connected with line 30 to the output of fourth memory 42. First adder circuit 48 has an output operatively connected with line 50 to provide the sum of the input pixel data. Summing circuit 26 also includes a second adder circuit 52 having a first input operatively connected with line 32 to the output of fifth memory 44, and a second input operatively connected with line 34 to the output of sixth memory 46. Second adder circuit 52 has an output operatively connected with line 54 to provide the sum of the input pixel data.

Further, summing circuit 26 includes a third adder circuit 56 having a first input operatively connected with line 50 to the output of first adder circuit 48, a second input operatively connected with line 54 to the output of second adder circuit 52, and an output operatively connected with line 58 to provide the sum of the input pixel data, whereby the data of 4 selected pixels is summed. A divide-by-4 circuit 60 divides the sum of the pixel data, or scaled pixel data $SI^{2nd}$ to complete the interpolation process.

Source pixel selector 20 selects pixel addresses in first memory 12 for the input of pixel data into third 40, fourth 42, fifth 44, and sixth 46 memories. Source pixel selector 20 selects the outputs of third 40, fourth 42, fifth 44, and sixth 46 memories as follows:

selecting source location (X,Y) as pixel address A, with the pixel data of pixel address A being selected as third 40, fourth 42, fifth 44, and sixth 46 memory outputs so that $SI^{2nd}=4A$, when the two most significant bits of both $x_f$ and $y_f$, of the source location written in binary form, are 0.10;

selecting source location (X,Y) as pixel address A, and (X+1, Y) as pixel address B, with the pixel data of pixel address A being selected as third 40, fourth 42, and fifth 44 memory outputs, and B selected as sixth memory 46 output so that $SI^{2nd}=3A+B$, when the two most significant bits of $x_f$ are 0.11, and of $y_f$ are 0.10;

selecting source location (X−1,Y) as pixel address A, and (X,Y) as pixel address B, with the pixel data of pixel address A being selected as third 40 and fourth 42 memory outputs, and B selected as fifth 44 and sixth 46 memory outputs so that $SI^{2nd}=2A+2B$, when the two most significant bits of $x_f$ are 0.00, and of $y_f$ are 0.11 and 0.10;

selecting source location (X−1, Y) as pixel address A, and (X,Y) as pixel address B, with the pixel data of pixel address A being selected as third memory 40 output, and B selected as fourth 42, fifth 44, and sixth 46 memory outputs so that $SI^{2nd}=A+3B$, when the two most significant bits of $x_f$ are 0.01, and of $y_f$ are 0.10;

selecting source location (X,Y) as pixel address A, and (X,Y+1) as pixel address D, with the pixel data of pixel address A being selected as third 40, fourth 42, and fifth 44 memory outputs, and D selected as sixth memory 46 output so that $SI^{2nd}=3A+D$, when the two most significant bits of $x_f$ are 0.10, and of $y_f$ are 0.11;

selecting source address (X,Y) as pixel address A, (X+1, Y) as pixel address B, and (X, Y+1) as pixel address D, with the pixel data of pixel address A being selected as third 40 and fourth 42 memory outputs, B selected as fifth memory 44 output, and D selected as sixth memory 46 output so that $SI^{2nd}=2A+B+D$, when the two most significant bits of both $x_f$ and $y_f$ are 0.11;

selecting source address (X−1,Y) as pixel address A, (X,Y) as pixel address B, and (X,Y+1) as pixel address C, with the pixel data of pixel address A being selected as third memory 40 output, B selected as fourth 42 and fifth 44 memory outputs, and C selected as sixth memory 46 output so that $SI^{2nd}=A+2B+C$, when the two most significant bits of $x_f$ are 0.01, and of $y_f$ are 0.11;

selecting source address (X,Y−1) as pixel address A, and (X,Y) as pixel address D, with the pixel data of pixel address A being selected as third 40 and fourth 42 memory outputs, and D selected as fifth 44 and sixth 46 memory outputs so that $SI^{2nd}=2A+2D$, when the two most significant bits of $x_f$ are 0.10 and 0.11, and of $y_f$ are 0.00;

selecting source address (X−1,Y−1) as pixel address A, (X,Y−1) as pixel address B, (X,Y) as pixel address C, and (X−1,Y) as pixel address D, with the pixel data of pixel address A being selected as third memory 40 output, B selected as fourth memory 42 output, C selected as fifth memory 44 output, and D selected as sixth memory 46 output so that $SI^{2nd}=A+B+C+D$, when the two most significant bits of both $x_f$ and $y_f$ are 0.00;

selecting source address (X,Y−1) as pixel address B, and (X,Y) as pixel address C, with the pixel data of pixel address B being selected as third 40 and fourth 42 memory outputs, and C selected as fifth 44 and sixth 46 memory outputs so that $SI^{2nd}=2B+2C$, when the two most significant bits of $x_f$ are 0.01, and of $y_f$ are 0.00;

selecting source address (X,Y−1) as pixel address A, and (X,Y) as pixel address D, with the pixel data of pixel address A being selected as third memory 40 output, and D selected as fourth 42, fifth 44, and sixth 46 memory outputs so that $SI^{2nd}=A+3D$, when the two most significant bits of $x_f$ are 0.10, and of $y_f$ are 0.01;

selecting source address (X,Y−1) as pixel address A, (X+1, Y) as pixel address C, and (X,Y) as pixel address D, with the pixel data of pixel address A being selected as third memory 40 output, C selected as fourth memory 42 output, and D selected as fifth 44 and sixth 46 memory outputs so that $SI^{2nd}=A+C+2D$, when the two most significant bits of $x_f$ are 0.11, and of $y_f$ are 0.01;

selecting source address (X,Y) as pixel address C, and (X−1,Y) as pixel address D, with the pixel data of pixel address C being selected as third 40 and fourth 42 memory outputs, and D selected as fifth 44 and sixth 46 memory outputs so that $SI^{2nd}=2C+2D$, when the two most significant bits of $x_f$ are 0.00, and of $y_f$ are 0.01; and selecting source address (X,Y−1) as pixel address B, (X,Y) as pixel address C, and (X−1,Y) as pixel address D, with the pixel data of pixel address B being selected as third memory 40 output, C selected as fourth 42 and fifth 44 memory outputs, and D selected as sixth memory 46 output so that $SI^{2nd}=B+2C+D$, when the two most significant bits of both $x_f$ and $y_f$ are 0.01.

The present invention interpolates the four selected addresses of pixel information with simple addition, as opposed to more complex multiplication processes of the prior art. Multiplication is done in both software and hardware. Hardware to perform the addition of bits in a binary numbering system is common, such as the National Semiconductor 7483 IC. Hardware to perform multiplication is less common, more complex to interface, and more expensive. Likewise, in software, addition is much easier than multiplication. For example, one software multiplication method is to "shift and add". The multiplication of 5 (0101) times 6 (0110) is presented below. For every "1" in the number 5, the number 6 is shifted and added, as follows:

```
        0 1 1 0   1   =       0 1 1 0   (which is 6)
      0 1 1 0     0   =     0 0 0 0
    0 1 1 0           1   =   0 1 1 0       (which is 24)
                        added 0 1 1 1 1 0   (which is 30).
```

As can be seen in the above example, multiplication requires several steps of shifting, and a final step of addition. Prior art interpolation processes typically require at least two microprocessor clock periods, which contribute a delay of several hundred nanoseconds, dramatically slowing the affine transformation process.

The system of FIG. 3 uses a pipeline clock, and the path between first memory 12 and second memory 35 is considered a "pipeline". For each pixel of data going in, one pixel of data comes out. One pipeline clock period is used to move data from first memory 12 into third 40, fourth 42, fifth 44, and sixth 46 memories. A second pipeline clock period moves the calculated interpolation value into second memory 36. The time required to process an image made up of N by M pixels is only N*M+1 periods.

In prior art multiplication systems, where fractional portions of the addresses are multiplied together to determine weighting factors, and the weighting factors are then multiplied and added to calculate the interpolation value, a large number of clock periods are necessary. If each step of multiplication takes one clock period, then the total number of clock periods needed to process an entire image is 8*N*M. Alternately, eight hardware multipliers are used at the expense of a large area of dedicated circuitry. The settling time for a multiplier is several times longer than the interpolation system of FIG. 3, since the multiplier can be conceptualized as being composed of several levels of adders.

The speed of the system of FIG. 3 is only restrained by the propagation delay through adders 48 (or 52) and 56, and shifter 60. In some aspects of the invention the system speed is increased by adding additional pipeline delays, at the outputs of adders 48 and 52, and the output of shifter 60, for example. Two more clock periods are added to the processing time (N*M+3). The advantage of additional pipeline delay is that the physical distance between circuits is made shorter and more uniform, permitting a smaller clock period. A higher clock frequency, or shorter clock period results in a quicker overall interpolation process.

FIG. 4 is a flow chart illustrating steps in the multiplication-free interpolation method for transforming an image formed in a first coordinate system into a transformed image in a second coordinate system. An image data processor is provided in Step 70, including a first memory to store first image information ($I^{1st}$) as discrete pixel data, with each pixel having an address corresponding to a location in a first coordinate system. Step 72 selects a second image location in the second coordinate system. Step 74 determines a first image location in the first coordinate system corresponding to the second location selected in Step 72.

Step 76 identifies up to four pixel addresses in the first memory proximately located to the first image location determined in Step 74. Step 78 sums the first image pixel data ($I^{1st}$) of the pixel addresses identified in Step 76 in a weighted average for transfer to the second image location as second image information ($I^{2nd}$). Step 80 is a product, an image transformation where first image information ($I^{1st}$) is interpolated by a simple addition process.

In some aspects of the invention, a second memory is provided to store second image information ($I^{2nd}$) as discrete pixel data with each pixel having an address corresponding to a location in the second coordinate system. Then, Step 72 includes the selection of an address in the second memory to store second image information. A further step (not shown), following Step 78, and preceding Step 80, transfers the second image information ($I^{2nd}$) interpolated in Step 78 to the second memory address selected in Step 72, whereby the first image is transferred to the second memory as the second image.

Step 78 includes summing first image information ($I^{1st}$) of each identified pixel address in increments of one-quarter of its pixel data value, whereby an interpolated value is calculated for the second image by summing one or more values in the first image.

The first memory addresses correspond to locations (X,Y) in the first coordinate system separated by integer X and Y increment values, in which the first image location determined in Step 74 includes X and Y increment values and a predetermined number of fractional bits of partial X and Y increment values $x_f$ and $y_f$, respectively, whereby the first image location determined in Step 74 is (X+$x_f$, Y+$y_f$).

FIG. 5 is a flow chart illustrating in greater detail the pixel identification step of FIG. 4. Steps 70–74 are essentially the same as in FIG. 4, described above. In FIG. 5, Step 76 is subdivided into a number of more specific steps. Step 78 includes, for each first image location (X+$x_f$, Y+$y_f$) determined in Step 74, summing the pixel data of the first memory addresses identified in the subdivided steps of Step 76, to interpolate and scale pixel data ($SI^{2nd}$) as follows:

Step 82 selects addresses so that $SI^{2nd}=I^{1st}(X, Y)+I^{1st}(X, Y)+I^{1st}(X, Y)+I^{1st}(X, Y)$, when a decision has been made, in Step 84, that the two most significant bits of both $x_f$ and $y_f$, written in binary form, are 0.10. Step 86 selects addresses so that $SI^{2nd}=I^{1st}(X, Y)+I^{1st}(X, Y)+I^{1st}(X, Y)+I^{1st}(X+1, Y)$, when a decision has been made, in Step 88, that the two most significant bits of $x_f$ are 0.11, and of $y_f$ are 0.10. Step 90 selects addresses so that $SI^{2nd}=I^{1st}(X-1, Y)+I^{1st}(X-1, Y)+I^{1st}(X, Y)+I^{1st}(X, Y)$, when a decision has been made, in Step 92, that the two most significant bits of $x_f$ are 0.00, and of $y_f$ are 0.11 and 0.10. Step 94 selects addresses so that $SI^{2nd}=I^{1st}(X-1, Y)+I^{1st}(X, Y)+I^{1st}(X, Y)+I^{1st}(X, Y)$, when a decision has been made, in Step 96, that the two most significant bits of $x_f$ are 0.01, and of $y_f$ are 0.10.

Step 98 selects addresses so that $SI^{2nd}=I^{1st}(X, Y)+I^{1st}(X, Y)+I^{1st}(X, Y)+I^{1st}(X, Y+1)$, when a decision is made, in Step 100, that the two most significant bits of $x_f$ are 0.10, and of $y_f$ are 0.11. Step 102 selects addresses so that $SI^{2nd}=I^{1st}(X, Y)+I^{1st}(X, Y)+I^{1st}(X+1, Y)+I^{1st}(X, Y+1)$, when a decision has been made, in Step 104, that the two most significant bits of both $x_f$ and $y_f$ are 0.11. Step 106 selects addresses so that $SI^{2nd}=I^{1st}(X-1, Y)+I^{1st}(X, Y)+I^{1st}(X, Y)+I^{1st}(X, Y+1)$, when a decision has been made, in Step 108, that the two most significant bits of $x_f$ are 0.01, and of $y_f$ are 0.11. Step 110 selects addresses so that $SI^{2nd}=I^{1st}(X, Y-1)+I^{1st}(X, Y-1)+I^{1st}(X, Y)+I^{1st}(X, Y)$, when a decision has been made, in Step 112, that the two most significant bits of $x_f$ are 0.10 and 0.11, and of $y_f$ are 0.00. Step 114 selects addresses so that $SI^{2nd}=I^{1st}(X-1, Y-1)+I^{1st}(X, Y-1)+I^{1st}(X, Y)+I^{1st}(X-1, Y)$, when a decision has been made, in Step 116, that the two most significant bits of both $x_f$ and $y_f$ are 0.00. Step 118 selects addresses so that $SI^{2nd}=I^{1st}(X, Y-1)+I^{1st}(X, Y-1)+I^{1st}(X, Y)+I^{1st}(X, Y)$, when a decision has been made, in Step 120, that the two most significant bits of $x_f$ are 0.01, and of $y_f$ are 0.00.

Step 122 selects addresses so that $SI^{2nd}=I^{1st}(X, Y-1)+I^{1st}(X, Y)+I^{1st}(X, Y)+I^{1st}(X, Y)$, when a decision is made, in Step 124, that the two most significant bits of $x_f$ are 0.10, and of $y_f$ are 0.01. Step 126 selects addresses so that $SI^{2nd}=I^{1st}(X, Y-1)+I^{1st}(X+1, Y)+I^{1st}(X, Y)+I^{1st}(X, Y)$, when a decision is made, in Step 128, that the two most significant bits of $x_f$ are 0.11, and of $y_f$ are 0.01. Step 130 selects addresses so that $SI^{2nd}=I^{1st}(X, Y)+I^{1st}(X, Y)+I^{1st}(X-1, Y)+I^{1st}(X-1, Y)$, when a decision is made, in Step 132, that the two most significant bits of $x_f$ are 0.00, and of $y_f$ are 0.01. Finally, Step 134 selects addresses so that $SI^{2nd}=I^{1st}(X, Y-1)+I^{1st}(X, Y)+I^{1st}(X, Y)+I^{1st}(X-1, Y)$, when a decision is made, in Step 136, that the two most significant bits of both $x_f$ and $y_f$ are 0.01.

Steps 78 and 80 of FIG. 5 are essentially the same as Steps 78 and 80 of FIG. 4, and a discussion of them will not be repeated here.

FIG. 6 is a flow chart illustrating in greater detail the pixel identification and one-quarter pixel weighting steps of FIG.

5. Steps 70–74 are essentially the same as in FIG. 4, discussed above. Third, fourth, fifth, and sixth memories are provided, with each memory capable of storing the pixel data of addresses A, B, C, and D. Step 74 includes identifying and labeling the four identified pixel addresses as A, B, C, and D in response to the values $x_f$ and $y_f$ of the source location. Sub-steps of Step 76 (FIG. 4), following Step 74 and preceding Step 78 (FIG. 4) are identified as Steps 140, 144, 148, 152, 156, 160, 164, 168, 172, 176, 180, 184, 188, and 192, and described below as using the values $x_f$ and $y_f$ of the source location to weight how many times each A, B, C, and D pixel address is used in the weighted average of pixel data. In this manner, pixel data is selected in response to the proximity the pixel address to the first location within one-quarter of X and Y axis integer values.

Further Sub-steps of Step 76 (FIG. 4), described below as Steps 142, 146, 150, 154, 158, 162, 166, 170, 174, 178, 182, 186, 190, and 192 include, for each of the third, fourth, fifth, and sixth memories, selecting the pixel data from one of the four stored pixel addresses for summation in Step 78, in response to the address weighting process of the preceding Sub-steps. In this manner, the fractional bits of the source location are used to weight pixel data with regard to the proximity of the pixel addresses selected in Step 76 (FIG. 4), and the source location determined in Step 74.

Specifically, pixel addresses are stored in the third, fourth, fifth, and sixth memories and selected in Sub-steps of Step 76. FIG. 6 is a more detailed illustration of Steps 84, 88, 92, 96, 100, 104, 108, 112, 116, 120, 124, 128, 132, and 136 of FIG. 5. Step 140 selects source location (X,Y) as pixel address A, with the pixel data of pixel address A being selected as the third, fourth, fifth, and sixth memory outputs in Step 142. $SI^{2nd}=4A$, when a decision is made, in Step 84, that the two most significant bits of both $x_f$ and $y_f$, of the source location written in binary form, are 0.10. Step 144 selects source location (X,Y) as pixel address A, and (X+1, Y) as pixel address B, with the pixel data of pixel address A being selected as said third, fourth, and fifth memory outputs, and B selected as said sixth memory output in Step 146. $SI^{2nd}=3A+B$, when a decision is made, in Step 88, that the two most significant bits of $x_f$ are 0.11, and of $y_f$ are 0.10.

Step 148 selects source location (X−1,Y) as pixel address A, and (X,Y) as pixel address B, with the pixel data of pixel address A being selected as said third and fourth memory outputs, and B selected as said fifth and sixth memory outputs in Step 150. $SI^{2nd}=2A+2B$, when a decision is made, in Step 92, that the two most significant bits of $x_f$ are 0.00, and of $y_f$ are 0.11 and 0.10. Step 152 selects source location (X−1,Y) as pixel address A, and (X,Y) as pixel address B, with the pixel data of pixel address A being selected as said third memory output, and B selected as said fourth, fifth, and sixth memory outputs in Step 154 . $SI^{2nd}=A+3B$, when a decision is made, in step 96, that the two most significant bits of $x_f$ are 0.01, and of $y_f$ are 0.10.

Step 156 selects source location (X,Y) as pixel address A, and (X,Y+1) as pixel address D, with the pixel data of pixel address A being selected as said third, fourth, and fifth memory outputs, and D selected as said sixth memory output in Step 158. $SI^{2nd}=3A+D$, when a decision is made, in Step 100, that the two most significant bits of $x_f$ are 0.10, and of $y_f$ are 0.11. Step 160 selects source address (X,Y) as pixel address A, (X+1, Y) as pixel address B, and (X, Y+1) as pixel address D, with the pixel data of pixel address A being selected as said third and fourth memory outputs, B selected as said fifth memory output, and D selected as said sixth memory output in Step 162. $SI^{2nd}=2A+B+D$, when a decision is made, in Step 104, that the two most significant bits of both $x_f$ and $y_f$ are 0.11.

Step 164 selects source address (X−1,Y) as pixel address A, (X,Y) as pixel address B, and (X,Y+1) as pixel address C, with the pixel data of pixel address A being selected as said third memory output, B selected as said fourth and fifth memory outputs, and C selected as said sixth memory output in Step 166. $SI^{2nd}=A+2B+C$, when a decision is made, in Step 108, that the two most significant bits of $x_f$ are 0.01, and of $y_f$ are 0.11. Step 168 selects source address (X,Y−1) as pixel address A, and (X,Y) as pixel address D, with the pixel data of pixel address A being selected as said third and fourth memory outputs, and D selected as said fifth and sixth memory outputs in Step 170. $SI^{2nd}=2A+2D$, when a decision is made, in Step 112, that the two most significant bits of $x_f$ are 0.10 and 0.11, and of $y_f$ are 0.00.

Step 172 selects source address (X−1,Y−1) as pixel address A, (X,Y−1) as pixel address B, (X,Y) as pixel address C, and (X−1,Y) as pixel address D, with the pixel data of pixel address A being selected as said third memory output, B selected as said fourth memory output, C selected as said fifth memory output, and D selected as said sixth memory output in Step 174. $SI^{2nd}=A+B+C+D$, when a decision is made, in Step 116, that the two most significant bits of both $x_f$ and $y_f$ are 0.00. Step 176 selects source address (X,Y−1) as pixel address B, and (X,Y) as pixel address C, with the pixel data of pixel address B being selected as said third and fourth memory outputs, and C selected as said fifth and sixth memory outputs in Step 178. $SI^{2nd}=2B+2C$, when a decision is made, in Step 120, that the two most significant bits of $x_f$ are 0.01, and of $y_f$ are 0.00.

Step 180 selects source address (X,Y−1) as pixel address A, and (X,Y) as pixel address D, with the pixel data of pixel address A being selected as said third memory output, and D selected as said fourth, fifth, and sixth memory outputs in Step 182. $SI^{2nd}=A+3D$, when a decision is made, in Step 124, that the two most significant bits of $x_f$ are 0.10, and of $y_f$ are 0.01. Step 184 selects source address (X,Y−1) as pixel address A, (X+1, Y) as pixel address C, and (X,Y) as pixel address D, with the pixel data of pixel address A being selected as said third memory output, C selected as said fourth memory output, and D selected as said fifth and sixth memory outputs in Step 186. $SI^{2nd}=A+C+2D$, when a decision is made, in Step 128, that the two most significant bits of $x_f$ are 0.11, and of $y_f$ are 0.01.

Step 188 selects source address (X,Y) as pixel address C, and (X−1,Y) as pixel address D, with the pixel data of pixel address C being selected as said third and fourth memory outputs, and D selected as said fifth and sixth memory outputs in Step 190. $SI^{2nd}=2C+2D$, when a decision is made, in Step 132, that the two most significant bits of $x_f$ are 0.00, and of $y_f$ are 0.01. Step 192 selects source address (X,Y−1) as pixel address B, (X,Y) as pixel address C, and (X−1,Y) as pixel address D, with the pixel data of pixel address B being selected as said third memory output, C selected as said fourth and fifth memory outputs, and D selected as said sixth memory output in Step 194. $SI^{2nd}=B+2C+D$, when a decision is made, in Step 136, that the two most significant bits of both $x_f$ and $y_f$ are 0.01.

FIG. 7 is an interpolation map illustrating the relationship between fractional addresses and the pixel interpolation weighting criteria. A similar map guides the selection of pixels by source pixel selector 20 of FIG. 3, and the various pixel selection steps identified in FIGS. 4, 5, and 6. The map shows the source location area surrounded by 4 discrete pixel addresses. 16 interpolation formulas describe every possible source location in the area. Since some areas use a common formula, a total of 14 formulas are needed. It is the insight of the present invention, that a simplification of the interpolation formulas eliminates the need to calculate a custom formula for every calculated source location. The simplified interpolation formulas permit the interpolation calculation to be done with only additive operations.

Returning again to FIG. 6, Step 78 (FIGS. 4, 5) is shown divided into Sub-steps 196–202. Step 196 adds the pixel data selected from the third memory, to the pixel data selected from the fourth memory. Step 198 adds the pixel data selected from the fifth memory, to the pixel data selected from the sixth memory. Step 200 adds the results of Sub-step 196 to Sub-step 198. In this manner, the pixel data of the 4 identified pixel addresses are summed.

A further step, Step 202, divides scaled pixel data ($SI^{2nd}$) by 4 to complete the interpolation process, whereby the summed first image information ($I^{2nd}$) is interpolated.

The present invention substantially reduces the processor time required to make an interpolation calculation. Even when hardware is used to make interpolation calculations, the numbers and complexity of the required ICs is reduced using the system and method of the present invention. The simplified interpolation process results is essentially no discernible degradation in image transformation, and the increased speed allows the associated image processor to perform other functions to increase the overall speed or precision of an affine transformation. Alternately, the system of the present invention is be used to examine only one bit to the right of the decimal place (0.5 pixel address resolution) of the calculated source address for increased speed, or three or more bits to the right of the decimal place for increased precision. Other alternative embodiments of the invention will occur to those skilled in the art.

What is claimed is:

1. A multiplication-free image data interpolation system for use in an image data processor which transforms a first image formed in a first coordinate system into a transformed image in a second coordinate system, the interpolation system comprising:

a first memory for storing first image information ($I^{1st}$) as pixel data with discrete pixel addresses corresponding to locations in the first coordinate system, said first memory having an output;

a source location calculator having an input to accept locations in the second coordinate system, from which source locations of image information ($I^{1st}$) in the first coordinate system are determined and made available on a source location calculator output, in which the source locations of image information ($I^{1st}$) in the first coordinate system, determined by said source location calculator, include source locations intermediately located between discrete addresses in said first memory;

a source pixel selector having an input operatively connected to said source location calculator output, for identifying up to four pixels in said first memory from which image information ($I^{2nd}$) is derived for each second image location, said source pixel selector having an output to provide pixel identification, in which said source pixel selector identifies up to four pixel addresses in said first memory proximate each source location from which image information ($I^{2nd}$) is derived for each second image location; and a summing circuit having inputs operatively connected to said first memory output, to sum the data ($I^{1st}$) of the pixels identified by said source pixel selector, in the calculation of a weighted average for transfer to each second image location as second image information ($I^{2nd}$), in which the first memory pixel data ($I^{1st}$) from selected pixel addresses is summed in increments of one-quarter of its pixel data value, and in which said summing circuit sums the weighted pixel data ($I^{1st}$) from each selected pixel address to determine second image information ($I^{2nd}$), each weighted summation based on the proximity of selected first memory pixel addresses and the corresponding source location within one-quarter of a discrete pixel address, whereby image information is interpolated by a simple addition process.

2. A system as in claim 1 further comprising a second memory, having an output operatively connected to said source location calculator input to provide discrete pixel addresses in said second memory as second image locations, said second memory also having an input for accepting the second image information ($I^{2nd}$) as pixel data in discrete pixel addresses.

3. A system as in claim 2 in which said first memory stores pixel data ($I^{1st}$) in discrete addresses corresponding to locations (X, Y) in the first coordinate system separated by integer X and Y increment values, and the source location in the first coordinate system calculated by said source location calculator for each second image pixel address includes X and Y increment values and a predetermined number of fractional bits of partial X and Y increment values $x_f$ and $y_f$, respectively, whereby the source location for each second image pixel location is $(X+x_f, Y+y_f)$ in the first coordinate system.

4. A system as in claim 3 in which scaled pixel data ($SI^{2nd}$) for each second memory address is determined by said summing circuit, from a source location $(X+x_f, Y+y_f)$ in the first coordinate system (X, Y), by weighing the pixel data ($I^{1st}$) of addresses identified by said source pixel selector as follows:

$SI^{2nd}=I^{1st}(X, Y)+I^{1st}(X, Y)+I^{1st}(X, Y)+I^{1st}(X, Y)$, when the two most significant bits of both $x_f$ and $y_f$, written in binary form, are 0.10;

$SI^{2nd}=I^{1st}(X,Y)+I^{1st}(X, Y)+I^{1st}(X,Y)+I^{1st}(X+1,Y)$, when the two most significant bits of $x_f$ are 0.11, and of $y_f$ are 0.10;

$SI^{2nd}=I^{1st}(X-1, Y)+I^{1st}(X-1, Y)+I^{1st}(X, Y)+I^{1st}(X, Y)$, when the two most significant bits of $x_f$ are 0.00, and of $y_f$ are 0.11 and 0.10;

$SI^{2nd}=I^{1st}(X-1,Y)+I^{1st}(X,Y)+I^{1st}(X,Y)+I^{1st}(X,Y)$, when the two most significant bits of $x_f$ are 0.01, and of $y_f$ are 0.10;

$SI^{2nd}=I^{1st}(X,Y)+I^{1st}(X,Y)+I^{1st}(X,Y)+I^{1st}(X,Y+1)$, when the two most significant bits of $x_f$ are 0.10, and of $y_f$ are 0.11;

$SI^{2nd}=I^{1st}(X, Y)+I^{1st}(X, Y)+I^{1st}(X+1, Y)+I^{1st}(X, Y+1)$, when the two most significant bits of both $x_f$ and $y_f$ are 0.11;

$SI^{2nd}=I^{1st}(X-1, Y)+I^{1st}(X, Y)+I^{1st}(X, Y)+I^{1st}(X, Y+1)$, when the two most significant bits of $x_f$ are 0.01, and of $y_f$ are 0.11;

$SI^{2nd}=I^{1st}(X, Y-1)+I^{1st}(X, Y-1)+I^{1st}(X, Y)+I^{1st}(X, Y)$, when the two most significant bits of $x_f$ are 0.10 and 0.11, and of $y_f$ are 0.00;

$SI^{2nd}=I^{1st}(X-1, Y-1)+I^{1st}(X, Y-1)+I^{1st}(X, Y)+I^{1st}(X-1, Y)$, when the two most significant bits of both $x_f$ and $y_f$ are 0.00;

$SI^{2nd}=I^{1st}(X, Y-1)+I^{1st}(X, Y-1)+I^{1st}(X, Y)+I^{1st}(X, Y)$, when the two most significant bits of $x_f$ are 0.01, and of $y_f$ are 0.00;

$SI^{2nd}=I^{1st}(X, Y-1)+I^{1st}(X, Y)+I^{1st}(X, Y)+I^{1st}(X, Y)$, when the two most significant bits of $x_f$ are 0.10, and of $y_f$ are 0.01;

$SI^{2nd}=I^{1st}(X, Y-1)+I^{1st}(X+1, Y)+I^{1st}(X, Y)+I^{1st}(X, Y)$, when the two most significant bits of $x_f$ are 0.11, and of $y_f$ are 0.01;

$SI^{2nd}=I^{1st}(X, Y)+I^{1st}(X, Y)+I^{1st}(X-1, Y)+I^{1st}(X-1, Y)$, when the two most significant bits of $x_f$ are 0.00, and of $y_f$ are 0.01; and $SI^{2nd}=I^{1st}(X, Y-1)+I^{1st}(X, Y)+I^{1st}(X, Y)+I^{1st}(X-1, Y)$, when the two most significant bits of both $x_f$ and $y_f$ are 0.01.

5. A system as in claim 4 in which said summing circuit divides each scaled pixel data ($SI^{2nd}$) by 4 to complete the interpolation process, before transferring second image pixel data ($I^{2nd}$) to pixel addresses in said second memory, whereby the summed first image information ($I^{1st}$) is interpolated.

6. A system as in claim 5 further comprising:
a third memory having inputs operatively connected to said first memory output and said source pixel selector output for storing the pixel data ($I^{1st}$) of four pixel addresses A, B, C, and D in said first memory identified by said pixel selector, said third memory having an output operatively connected to supply said summing circuit with the pixel data ($I^{1st}$) of one pixel address in response to commands from said source pixel selector;
a fourth memory having inputs operatively connected to said first memory output and said source pixel selector output for storing the pixel data ($I^{1st}$) of four pixel addresses A, B, C, D in said first memory identified by said pixel selector, said fourth memory having an output operatively connected to supply said summing circuit with the pixel data ($I^{1st}$) of one pixel address in response to commands from said source pixel selector;
a fifth memory having inputs operatively connected to said first memory output and said source pixel selector output for storing the pixel data ($I^{1st}$) of four pixel addresses A, B, C, and D in said first memory identified by said pixel selector, said fifth memory having an output operatively connected to supply said summing circuit with the pixel data ($I^{1st}$) of one pixel address in response to commands from said source pixel selector;
a sixth memory having inputs operatively connected to said first memory output and said source pixel selector output for storing the pixel data ($I^{1st}$) of four pixel addresses A, B, C, and D in said first memory identified by said pixel selector, said sixth memory having an output operatively connected to supply said summing circuit with the pixel data ($I^{1st}$) of one pixel address in response to commands from said source pixel selector.

7. A system as in claim 6 in which said summing circuit includes:
a first adder circuit having a first input operatively connected to said third memory output, a second input operatively connected to said fourth memory output, and an output to provide the sum of the input pixel data;
a second adder circuit having a first input operatively connected to said fifth memory output, a second input operatively connected to said sixth memory output, and an output to provide the sum of the input pixel data;
a third adder circuit having a first input operatively connected to said first adder circuit output, a second input operatively connected to said second adder circuit output, and an output to provide the sum of the input pixel data, whereby the data of 4 selected pixels is summed.

8. A system as in claim 7 in which said source pixel selector selects pixel addresses in said first memory for the input of pixel data into said third, fourth, fifth, and sixth memories, and said source pixel selector selecting the outputs of said third, fourth, fifth, and sixth memories as follows:

selecting source location (X,Y) as pixel address A, with the pixel data of pixel address A being selected as said third, fourth, fifth, and sixth memory outputs so that $SI^{2nd}=4A$, when the two most significant bits of both $x_f$ and $y_f$, of the source location written in binary form, are 0.10;

selecting source location (X,Y) as pixel address A, and (X+1, Y) as pixel address B, with the pixel data of pixel address A being selected as said third, fourth, and fifth memory outputs, and B selected as said sixth memory output so that $SI^{2nd}=3A+B$, when the two most significant bits of $x_f$ are 0.11, and of $y_f$ are 0.10;

selecting source location (X-1,Y) as pixel address A, and (X,Y) as pixel address B, with the pixel data of pixel address A being selected as said third and fourth memory outputs, and B selected as said fifth and sixth memory outputs so that $SI^{2nd}=2A+2B$, when the two most significant bits of $x_f$ are 0.00, and of $y_f$ are 0.11 and 0.10;

selecting source location (X-1,Y) as pixel address A, and (X,Y) as pixel address B, with the pixel data of pixel address A being selected as said third memory output, and B selected as said fourth, fifth, and sixth memory outputs so that $SI^{2nd}=A+3B$, when the two most significant bits of $x_f$ are 0.01, and of $y_f$ are 0.10;

selecting source location (X,Y) as pixel address A, and (X,Y+1) as pixel address D, with the pixel data of pixel address A being selected as said third, fourth, and fifth memory outputs, and D selected as said sixth memory output so that $SI^{2nd}=3A+D$, when the two most significant bits of $x_f$ are 0.10, and of $y_f$ are 0.11;

selecting source address (X,Y) as pixel address A, (X+1, Y) as pixel address B, and (X, Y+1) as pixel address D, with the pixel data of pixel address A being selected as said third and fourth memory outputs, B selected as said fifth memory output, and D selected as said sixth memory output so that $SI^{2nd}=2A+B+D$, when the two most significant bits of both $x_f$ and $y_f$ are 0.11;

selecting source address (X-1,Y) as pixel address A, (X,Y) as pixel address B, and (X,Y+1) as pixel address C, with the pixel data of pixel address A being selected as said third memory output, B selected as said fourth and fifth memory outputs, and C selected as said sixth memory output so that $SI^{2nd}=A+2B+C$, when the two most significant bits of $x_f$ are 0.01, and of $y_f$ are 0.11;

selecting source address (X,Y-1) as pixel address A, and (X,Y) as pixel address D, with the pixel data of pixel address A being selected as said third and fourth memory outputs, and D selected as said fifth and sixth memory outputs so that $SI^{2nd}=2A+2D$, when the two most significant bits of $x_f$ are 0.10 and 0.11, and of $y_f$ are 0.00;

selecting source address (X-1,Y-1) as pixel address A, (X,Y-1) as pixel address B, (X,Y) as pixel address C, and (X-1,Y) as pixel address D, with the pixel data of pixel address A being selected as said third memory output, B selected as said fourth memory output, C selected as said fifth memory output, and D selected as said sixth memory output so that $SI^{2nd}=A+B+C+D$, when the two most significant bits of both $x_f$ and $y_f$ are 0.00;

selecting source address (X,Y−1) as pixel address B, and (X,Y) as pixel address C, with the pixel data of pixel address B being selected as said third and fourth memory outputs, and C selected as said fifth and sixth memory outputs so that $SI^{2nd}=2B+2C$, when the two most significant bits of $x_f$ are 0.01, and of $y_f$ are 0.00;

selecting source address (X,Y−1) as pixel address A, and (X,Y) as pixel address D, with the pixel data of pixel address A being selected as said third memory output, and D selected as said fourth, fifth, and sixth memory outputs so that $SI^{2nd}=A+3D$, when the two most significant bits of $x_f$ are 0.10, and of $y_f$ are 0.01;

selecting source address (X,Y−1) as pixel address A, (X+1,Y) as pixel address C, and (X,Y) as pixel address D, with the pixel data of pixel address A being selected as said third memory output, C selected as said fourth memory output, and D selected as said fifth and sixth memory outputs so that $SI^{2nd}=A+C+2D$, when the two most significant bits of $x_f$ are 0.11, and of $y_f$ are 0.01;

selecting source address (X,Y) as pixel address C, and (X−1,Y) as pixel address D, with the pixel data of pixel address C being selected as said third and fourth memory outputs, and D selected as said fifth and sixth memory outputs so that $SI^{2nd}=2C+2D$, when the two most significant bits of $x_f$ are 0.00, and of $y_f$ are 0.01; and selecting source address (X,Y−1) as pixel address B, (X,Y) as pixel address C, and (X−1,Y) as pixel address D, with the pixel data of pixel address B being selected as said third memory output, C selected as said fourth and fifth memory outputs, and D selected as said sixth memory output so that $SI^{2nd}=B+2C+D$, when the two most significant bits of both $x_f$ and $y_f$ are 0.01.

9. In an image data processor including a first memory to store first image information ($I^{1st}$) as discrete pixel data with each pixel having an address corresponding to a location in a first coordinate system, wherein the first memory addresses correspond to locations (X,Y) in the first coordinate system separated by integer X and Y increment values, a multiplication free interpolation method for transforming an image formed in the first coordinate system into a transformed image in a second coordinate system comprising the steps of:

a) selecting a second image location in the second coordinate system;
   b) determining a first image location in the first coordinate system corresponding to the second location selected in Step a), in which the first image location includes X and Y increment values and a predetermined number of fractional bits of partial X and Y increment values $x_f$ and $y_f$, respectively, whereby the first image location is (X+$x_f$, Y+$y_f$);
   c) identifying up to four pixel addresses in the first memory proximately located to the first image location determined in Step b); and
   d) for each first image location (X+$x_f$, Y+$y_f$) determined in Step b), summing the first image pixel data ($I^{1st}$) of the pixel addresses identified in Step c) in a weighted average for transfer to the second image location as second image information ($I^{2nd}$), interpolating and scaling pixel data ($SI^{2nd}$) as follows:
   $SI^{2nd}=I^{1st}(X, Y)+I^{1st}(X, Y)+I^{1st}(X,Y)+I^{1st}(X, Y)$, when the two most significant bits of both $x_f$ and $y_f$ written in binary form, are 0.10;
   $SI^{2nd}=I^{1st}(X, Y)+I^{1st}(X, Y)+I^{1st}(X, Y)+I^{1st}(X+1, Y)$, when the two most significant bits of $x_f$ are 0.11, and of $y_f$ are 0.10;
   $SI^{2nd}=I^{1st}(X−1, Y)+I^{1st}(X−1, Y)+I^{1st}(X, Y)+I^{1st}(X, Y)$, when the two most significant bits of $x_f$ are 0.00, and of $y_f$ are 0.11 and 0.10;
   $SI^{2nd}=I^{1st}(X−1, Y)+I^{1st}(X, Y)+I^{1st}(X, Y)+I^{1st}(X, Y)$, when the two most significant bits of $x_f$ are 0.01, and of $y_f$ are 0.10;
   $SI^{2nd}=I^{1st}(X, Y)+I^{1st}(X, Y)+I^{1st}(X, Y)+I^{1st}(X, Y+1)$, when the two most significant bits of $x_f$ are 0.10, and of $y_f$ are 0.11;
   $SI^{2nd}=I^{1st}(X, Y)+I^{1st}(X, Y)+I^{1st}(X+1, Y)+I^{1st}(X, Y+1)$, when the two most significant bits of both $x_f$ and $y_f$ are 0.11;
   $SI^{2nd}=I^{1st}(X−1, Y)+I^{1st}(X, Y)+I^{1st}(X, Y)+I^{1st}(X, Y+1)$, when the two most significant bits of $x_f$ are 0.01, and of $y_f$ are 0.11;
   $SI^{2nd}=I^{1st}(X, Y−1)+I^{1st}(X, Y−1)+I^{1st}(X, Y)+I^{1st}(X, Y)$, when the two most significant bits of $x_f$ are 0.10 and 0.11, and of $y_f$ are 0.00;
   $SI^{2nd}=I^{1st}(X−1, Y−1)+I^{1st}(X, Y−1)+I^{1st}(X, Y)+I^{1st}(X−1, Y)$, when the two most significant bits of both $x_f$ and $y_f$ are 0.00;
   $SI^{2nd}=I^{1st}(X, Y−1)+I^{1st}(X, Y−1)+I^{1st}(X, Y)+I^{1st}(X Y)$, when the two most significant bits of $x_f$ are 0.01, and of $y_f$ are 0.00;
   $SI^{2nd}=I^{1st}(X, Y−1)+I^{1st}(X, Y)+I^{1st}(X, Y)+I^{1st}(X, Y)$, when the two most significant bits of $x_f$ are 0.10, and of $y_f$ are 0.01;
   $SI^{2nd}=I^{1st}(X, Y−1)+I^{1st}(X+1, Y)+I^{1st}(X, Y)+I^{1st}(X, Y)$, when the two most significant bits of $x_f$ are 0.11, and of $y_f$ are 0.01;
   $SI^{2nd}=I^{1st}(X, Y)+I^{1st}(X, Y)+I^{1st}(X−1, Y)+I^{1st}(X−1, Y)$, when the two most significant bits of $x_f$ are 0.00, and of $y_f$ are 0.01; and
   $SI^{2nd}=I^{1st}(X, Y−1)+I^{1st}(X, Y)+I^{1st}(X, Y)+I_{1st}(X−1, Y)$, when the two most significant bits of both $x_f$ and $y_f$ are 0.01, whereby the first image information ($I^{1st}$) being interpolated by a simple addition process which includes summing first image information ($I^{1st}$) of each identified pixel address in increments of one-quarter of its pixel data value, whereby an interpolated value is calculated for the second image by summing one or more values in the first image.

10. A method as in claim 9 wherein a second memory is provided to store second image information ($I^{2nd}$) as discrete pixel data with each pixel having an address corresponding to a location in the second coordinate system, in which Step a) includes the selection of an address in the second memory to store second image information, and further includes a step, following Step d), of:
   e) transferring the second image information ($I^{2nd}$) interpolated in Step d) to the second memory address selected in Step a), whereby the first image is transferred to the second memory as the second image.

11. A method as in claim 9 including a further step, following Step d), of:
   $d_1$) dividing scaled pixel data ($SI^{2nd}$) by 4 to complete the interpolation process, whereby the summed first image information ($I^{2nd}$) is interpolated.

12. A method as in claim 11 wherein third, fourth, fifth, and sixth memories are provided, with each memory capable of storing the pixel data of addresses A, B, C, and D, and in which Step b) includes identifying and labeling the four identified pixel addresses as A, B, C, and D in response to the values $x_f$ and $y_f$ of the source location;
   including a further step, following Step c), and preceding Step d), of Step $c_1$) which using the values $x_f$ and $y_f$ of the source location to weight how many times each A, B, C, and D pixel address is used in the weighted average of pixel data, whereby pixel data is selected in response to the proximity the pixel address to the first location within one-quarter of X and Y axis integer values; and $c_2$) which includes, for each of the third, fourth, fifth, and sixth memories, selecting the pixel data from one of the four stored pixel addresses for summation in Step d), in response to the address weighting process of Step $c_1$), whereby the fractional bits of the source location are used to weight pixel data with regard to the proximity of the pixel addresses selected in Step c) and the source location determined in Step b).

13. A method as in claim 12 in which Step d) includes the following sub-steps:

1) adding the pixel data selected from the third memory to the pixel data selected from the fourth memory;

2) adding the pixel data selected from the fifth memory to the pixel data selected from the sixth memory; and 3) adding the results of Sub-step 1) to Sub-step 2), whereby the pixel data of the 4 identified pixel addresses are summed.

14. A method as in claim 13 in which pixel addresses are stored in the third, fourth, fifth, and sixth memories and selected in Steps c), $c_1$), and $c_2$) as follows:

selecting source location (X,Y) as pixel address A, with the pixel data of pixel address A being selected as the third, fourth, fifth, and sixth memory outputs so that $SI^{2nd}=4A$, when the two most significant bits of both $x_f$ and $y_f$, of the source location written in binary form, are 0.10;

selecting source location (X,Y) as pixel address A, and (X+1,Y) as pixel address B, with the pixel data of pixel address A being selected as said third, fourth, and fifth memory outputs, and B selected as said sixth memory output so that $SI^{2nd}=3A+B$, when the two most significant bits of $x_f$ are 0.11, and of $y_f$ are 0.10;

selecting source location (X−1,Y) as pixel address A, and (X,Y) as pixel address B, with the pixel data of pixel address A being selected as said third and fourth memory outputs, and B selected as said fifth and sixth memory outputs so that $SI^{2nd}=2A+2B$, when the two most significant bits of $x_f$ are 0.00, and of $y_f$ are 0.11 and 0.10;

selecting source location (X−1,Y) as pixel address A, and (X,Y) as pixel address B, with the pixel data of pixel address A being selected as said third memory output, and B selected as said fourth, fifth, and sixth memory outputs so that $SI^{2nd}=A+3B$, when the two most significant bits of $x_f$ are 0.01, and of $y_f$ are 0.10;

selecting source location (X,Y) as pixel address A, and (X,Y+1) as pixel address D, with the pixel data of pixel address A being selected as said third, fourth, and fifth memory outputs, and D selected as said sixth memory output so that $SI^{2nd}=3A+D$, when the two most significant bits of $x_f$ are 0.10, and of $y_f$ are 0.11;

selecting source address (X,Y) as pixel address A, (X+1, Y) as pixel address B, and (X, Y+1) as pixel address D, with the pixel data of pixel address A being selected as said third and fourth memory outputs, B selected as said fifth memory output, and D selected as said sixth memory output so that $SI^{2nd}=2A+B+D$, when the two most significant bits of both $x_f$ and $y_f$ are 0.11;

selecting source address (X−1,Y) as pixel address A, (X,Y) as pixel address B, and (X,Y+1) as pixel address C, with the pixel data of pixel address A being selected as said third memory output, B selected as said fourth and fifth memory outputs, and C selected as said sixth memory output so that $SI^{2nd}=A+2B+C$, when the two most significant bits of $x_f$ are 0.01, and of $y_f$ are 0.11;

selecting source address (X,Y−1) as pixel address A, and (X,Y) as pixel address D, with the pixel data of pixel address A being selected as said third and fourth memory outputs, and D selected as said fifth and sixth memory outputs so that $SI^{2nd}=2A+2D$, when the two most significant bits of $x_f$ are 0.10 and 0.11, and of $y_f$ are 0.00;

selecting source address (X−1,Y−1) as pixel address A, (X,Y−1) as pixel address B, (X,Y) as pixel address C, and (X−1,Y) as pixel address D, with the pixel data of pixel address A being selected as said third memory output, B selected as said fourth memory output, C selected as said fifth memory output, and D selected as said sixth memory output so that $SI^{2nd}=A+B+C+D$, when the two most significant bits of both $x_f$ and $y_f$ are 0.00;

selecting source address (X,Y−1) as pixel address B, and (X,Y) as pixel address C, with the pixel data of pixel address B being selected as said third and fourth memory outputs, and C selected as said fifth and sixth memory outputs so that $SI^{2nd}=2B+2C$, when the two most significant bits of $x_f$ are 0.01, and of $y_f$ are 0.00;

selecting source address (X,Y−1) as pixel address A, and (X,Y) as pixel address D, with the pixel data of pixel address A being selected as said third memory output, and D selected as said fourth, fifth, and sixth memory outputs so that $SI^{2nd}=A+3D$, when the two most significant bits of $x_f$ are 0.10, and of $y_f$ are 0.01;

selecting source address (X,Y−1) as pixel address A, (X+1, Y) as pixel address C, and (X,Y) as pixel address D, with the pixel data of pixel address A being selected as said third memory output, C selected as said fourth memory output, and D selected as said fifth and sixth memory outputs so that $SI^{2nd}=A+C+2D$, when the two most significant bits of $x_f$ are 0.11, and of $y_f$ are 0.01;

selecting source address (X,Y) as pixel address C, and (X−1,Y) as pixel address D, with the pixel data of pixel address C being selected as said third and fourth memory outputs, and D selected as said fifth and sixth memory outputs so that $SI^{2nd}=2C+2D$, when the two most significant bits of $x_f$ are 0.00, and of $y_f$ are 0.01; and selecting source address (X,Y−1) as pixel address B, (X,Y) as pixel address C, and (X−1,Y) as pixel address D, with the pixel data of pixel address B being selected as said third memory output, C selected as said fourth and fifth memory outputs, and D selected as said sixth memory output so that $SI^{2nd}=B+2C+D$, when the two most significant bits of both $x_f$ and $y_f$ are 0.01.

* * * * *